US007058676B2

(12) United States Patent
Majani

(10) Patent No.: US 7,058,676 B2
(45) Date of Patent: Jun. 6, 2006

(54) DIGITAL FILTERING METHODS AND DEVICES

(75) Inventor: Eric Majani, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 441 days.

(21) Appl. No.: 09/972,994

(22) Filed: Oct. 10, 2001

(65) Prior Publication Data

US 2002/0078112 A1    Jun. 20, 2002

(30) Foreign Application Priority Data

Oct. 30, 2000    (FR) .................................. 00 13955

(51) Int. Cl.
    *G06F 17/10*    (2006.01)
(52) U.S. Cl. .................................... 708/322
(58) Field of Classification Search ......... 708/300–409
    See application file for complete search history.

(56) References Cited

U.S. PATENT DOCUMENTS

| 4,852,035 | A | | 7/1989 | Michener |
| 4,974,187 | A | * | 11/1990 | Lawton ........................ 708/420 |
| 6,216,145 | B1 | * | 4/2001 | Zandi et al. ................ 708/400 |
| 6,499,045 | B1 | * | 12/2002 | Turney et al. .............. 708/401 |
| 6,507,613 | B1 | | 1/2003 | Majani |
| 6,553,396 | B1 | * | 4/2003 | Fukuhara et al. ........... 708/300 |
| 6,757,343 | B1 | * | 6/2004 | Ortega et al. ............... 708/300 |

FOREIGN PATENT DOCUMENTS

FR    A-2 785 747    11/1998

JP    2000/40943    2/2000

OTHER PUBLICATIONS

Calderbank, et al., "Lossless Image Compression Using Integer to Integer Wavelet Transforms,"ICIP (International Conference on Image Processing), vol. I, pp. 596-599.
Sweldens, "The Lifting Scheme: A Custom-Design Construction of Biorthogonal Wavelets," Applied and Computational Harmonic Analysis, vol. 3, Article No. 0015, pp. 186-200 (1996).
Daubechies, et al., "Factoring Wavelet Transforms Into Lifting Steps," J. Fourier Anal. Appl., vol. 4, No. 3, pp. 247-269 (renumbered pp. 1-27) (1998).
Majani, "Low Complexity Wavelet Filter Design for Image Compression," TDA Progress Report 42-119, NASA Jet Propulsion Laboratory, Pasadena, CA, pp. 181-200 (Nov., 1994).

* cited by examiner

*Primary Examiner*—Wei Y. Zhen
*Assistant Examiner*—Chat C. Do
(74) *Attorney, Agent, or Firm*—Fitzpatrick, Cella, Harper & Scinto

(57) ABSTRACT

In order to transform an input digital signal ($x_n$) into one or more output digital signals ($y_n$) containing even-indexed samples ($y_{2n}$) and odd-indexed samples ($y_{2i+n}$), this filtering method includes at least one iteration which contains an operation of modifying even-indexed samples ($y_{2n}$) by a function (R) of weighted odd-indexed samples ($y_{2n+1}$), and an operation of modifying odd-indexed samples ($y_{2n+1}$) by a function (R) of weighted even-indexed samples ($\beta_{0,j}(y_{2n} - y_{2n+2})$). The weighted samples are obtained by at least one weighting operation. At least one of the weighting operations is applied to the difference between two consecutive even-indexed samples.

63 Claims, 9 Drawing Sheets

DIGITAL FILTERING METHODS AND DEVICES

BACKGROUND OF THE INVENTION

1. Field of the Invention

The present invention relates to digital filtering methods and devices.

It finds an advantageous application to the filtering of digital images, in particular for the compression of images in accordance with "JPEG 2000", currently being drafted.

2. Description of the Related Art

Two techniques are notably known for implementing the filtering of digital signals using wavelet filters:

filtering by convolution, and
filtering by "lifting".

A few elementary concepts on wavelet filters, and then on lifting, are given below.

It is known that the wavelet filtering of a monodimensional signal $X_i$ can be defined as:

the convolution of a low-pass filter $H_0(k)$ with the signal $X_i$, the signal $Y_n$ resulting from the convolution being downsampled by a factor of two:

$$Y_{2n} = \sum_k H_0(k) \cdot X_{2n-k} \quad (1)$$

and the convolution of a high-pass filter $H_1(k)$ with the signal $X_i$, the signal $Y_n$ resulting from the convolution being downsampled by a factor of two:

$$Y_{2n+1} = \sum_k H_1(k) \cdot X_{2n+1-k} \quad (2)$$

The result of the filtering, referred to as a wavelet filtering operation ($H_0$, $H_1$), produces a signal $Y_i$, in which each even-indexed sample $Y_{2n}$ is a low-pass coefficient and each odd-indexed odd-indexed sample $Y_{2n+1}$ is a high-pass coefficient.

The low-pass filter and the high-pass filter must satisfy certain conditions, referred to as perfect reconstruction conditions, so that the perfect reconstruction of the signal $X_i$ from the signal $Y_i$ is possible.

If the notation of the z transform is used for the finite impulse response filters, namely $$H_i(z) = \sum_k H_i(k) \cdot z^{-k}, \quad (3)$$

then the perfect reconstruction condition which the filters must satisfy is:

$$H_0(z).H_1(-z^{-1}) + H_0(-z).H_1(z^{-1}) = 2. \quad (4)$$

It is known that some wavelet filters have symmetry properties.

An odd-length symmetric wavelet filter $H(k)$ or WSS (Whole-Sample Symmetric) filter is defined by the following equation, referred to as WSS symmetry, between all the coefficients of the filter:

$$\forall k, H(-k) = H(k) \quad (5)$$

An even-length symmetric wavelet filter or HSS (Half-Sample Symmetric) filter is defined by the following equation, referred to as HSS symmetry, between all the coefficients of the filter:

$$\forall k, H(-k) = H(k+1). \quad (6)$$

An even-length antisymmetric wavelet filter or HSA (Half-Sample Antisymmetric) filter is defined by the following equation, referred to as HSA symmetry, between all the coefficients of the filter:

$$\forall k, H(-k) = -H(k+1). \quad (7)$$

The technique of lifting, mentioned above, consists of implementing a filtering step by decomposing it into an equivalent sequence of elementary filtering operations, referred to as lifting steps. This decomposition is referred to as lifting factorisation. For more details on lifting factorisation, reference can usefully be made to the article by Ingrid DAUBECHIES and Wim SWELDENS entitled "*Factoring wavelet transforms into lifting steps*", in J. Fourier Anal. Appl., vol. 4, No. 3, pages 247 to 269, 1998.

It should be stated in particular that, when a filtering operation is performed in the form of lifting steps, in order to transform a signal $X_i$ into a signal $Y_i$, it is generally begun by copying all the samples of the signal $X_i$ into the signal $Y_i$ (i.e. $Y_i = X_i$), and then the even-indexed samples and the odd-indexed samples of the signal $Y_i$ are modified alternately.

There are two types of lifting step:

high-pass lifting steps, and
low-pass lifting steps.

A high-pass lifting step consists of modifying odd-indexed samples by adding to them a sample function of even-indexed samples which are weighted or filtered:

$$\forall n, Y_{2n+1} = Y_{2n+1} + R\left(\sum_k a_k \cdot Y_{2n+2k}\right) \quad (8)$$

The function R is, in general terms, any approximation of the variable x. The function R can be a rounding operator which rounds a real value x to an integer (such as the closest integer), or can simply be identity: $R(x) = x$.

A low-pass lifting step consists of modifying even-indexed samples (low-pass) by adding to them a function of odd-indexed samples which are weighted or filtered:

$$\forall n, Y_{2n} = Y_{2n} + R\left(\sum_k b_k \cdot Y_{2n+2k+1}\right) \quad (9)$$

In the case where $R(x) = x$, at each lifting step, each low-pass sample $Y_{2n}$ can be expressed in the form of a linear combination of samples of the signal $X_i$, corresponding to a low-pass filtering of the signal $X_i$. Thus each low-pass lifting step can be associated with a low-pass filter.

It is said that each low-pass lifting step lifts a low-pass filter (one which is associated with the previous low-pass lifting step) into another low-pass filter (the one which is associated with the current low-pass lifting step). The term lifting accounts for the fact that the support of the resulting low-pass filter (that is to say the number of coefficients of the filter) is greater than that of the corresponding low-pass filter at the previous step. The low-pass filter with the larger support finally obtained by lifting is called the "equivalent low-pass filter".

The same applies to the high-pass filters and the lifting steps, that is to say each high-pass lifting step can be seen as the lifting of a high-pass filter into a high-pass filter with a larger support, referred to as the "equivalent high-pass filter".

The same terminology is used in the case where the approximation function R is not identity.

Thus the lifting-based implementation of a wavelet filtering operation ($H_0$, $H_1$) can be seen as a sequence of operations during which, alternately and iteratively, low-pass filters are lifted into equivalent low-pass filters with a larger support, and high-pass filters are lifted into equivalent high-pass filters with a larger support, until the low-pass filter is equal to $H_0$ and the high-pass filter is equal to $H_1$.

Several types of symmetry are also encountered in the lifting steps:
there are two types of symmetric lifting steps:
lifting steps with WSS symmetry, and
lifting steps with HSS symmetry; and
there are two types of antisymmetric lifting steps:
lifting steps with WSA antisymmetry, and
lifting steps with HSA antisymmetry.

An odd-length symmetric lifting or WSS lifting ("Whole-Sample Symmetric lifting") step is defined by a WSS symmetry relationship between the filtering coefficients of the lifting step:

$$a_{-k} = a_k \quad (10)$$

An even-length symmetric lifting or HSS lifting ("Half-Sample Symmetric lifting") step is defined by an HSS symmetry relationship between the filtering coefficients of the lifting step:

$$a_{-k} = a_{k-1} \quad (11)$$

An odd-length antisymmetric lifting or WSA lifting ("Whole-Sample Antisymmetric lifting") step is defined by a WSA symmetry relationship between the filtering coefficients of the lifting step:

$$a_0 = 0 \text{ and } a_{-k} = -a_k \quad (12)$$

An even-length antisymmetric lifting or HSA lifting ("Half-Sample Antisymmetric lifting") step is defined by an HSA symmetry relationship between the filtering coefficients of the lifting step:

$$a_{-k} = -a_{k-1} \quad (13)$$

A single-coefficient lifting or SC lifting ("Single-Coefficient lifting") step is defined by the fact that all the filtering coefficients of the lifting step except one (denoted $a_{k'}$) are zero.

For the low-pass lifting steps,
if k'=0, the lifting step is called a Right-side Single Coefficient low-pass lifting or RSC low-pass lifting step, and
if k'=−1, the lifting step is called a Left-side Single Coefficient low-pass lifting or LSC low-pass lifting step.

In a similar manner, for the high-pass lifting steps,
if k'=1, the lifting step is called a Right-side Single Coefficient high-pass lifting or RSC high-pass lifting step, and
if k'=0, the lifting step is called a Left-side Single Coefficient high-pass lifting or LSC high-pass lifting step.

Given that, at the present time, more and more signal compression algorithms use wavelet filtering operations for the decorrelation of the signals, it is very interesting to have available an effective implementation of these filtering operations. Various image compression algorithms use bidimensional wavelet transformations, which consist of the successive application of monodimensional transformations of the type described in the introduction.

An effective implementation of wavelet-based monodimensional filtering is lifting-based filtering.

It is known in fact that lifting-based filtering reduces the number of filtering operations (multiplications and additions) and also affords a reversible implementation of wavelet-based filtering, that is to say with perfect reconstruction of the signal, without loss of information, in the case of signals whose sample values are integer.

In addition, the step which is the reverse of a lifting step is obtained in a trivial fashion by changing the sign before the approximation function R given in equations (8) and (9) above. This makes it possible notably to use the same circuitry in a hardware implantation corresponding to both forward and reverse wavelet transformations.

For a given pair of wavelet filters ($H_0$,$H_1$) the problem consists of finding a sequence of lifting steps which will implement the wavelet transformation. This is the problem of lifting factorisation.

Two families of wavelet filters are known which have good signal decorrelation properties: the family WSS/WSS, abbreviated to WSS, and the family HSS/HSA, the notation A/B meaning that the low-pass filter $H_0$ has a symmetry A and the high-pass filter $H_1$ has a symmetry B.

The problem consisting of implementing WSS wavelet filters by using HSS lifting steps has been resolved and is described in the article by Ingrid DAUBECHIES and Wim SWELDENS cited above.

The problem consisting of implementing HSS/HSA wavelet filters has been partly resolved, by using WSA lifting steps.

However, this solution is only partial since this implementation of the prior art applies only to a limited set of HSS/HSA wavelet filters and not to all of these filters.

Moreover, the publication by E. MAJANI entitled "*Low-complexity wavelet filter design for image compression*", TDA Progress Report 42–119, NASA Jet Propulsion Laboratory, Pasadena, Calif., 15 Nov. 1994, indicates that it is possible to use WSA lifting steps for lifting a pair of filters ($H_0$,$H_1$), where the two filters have the same support, into a pair of filters with a larger support ($H'_0$,$H'_1$). However, no indication is found therein about the way of implementing, by lifting steps, pairs of filters ($H_0$,$H_1$) where the two filters have the same support and where this support is greater than two.

SUMMARY OF THE INVENTION

The purpose of the present invention is to remedy this drawback.

It proposes an implementation by lifting of all the HSS/HSA wavelet filters which cannot be implemented by using solely WSA lifting steps.

It therefore forms a solution to the problem of the implementation by lifting of pairs of filters ($H_0$,$H_1$) where the two filters have the same support and where the support is greater than 2.

To this end, the present invention proposes a filtering method adapted to transform an input digital signal into one or more output digital signals having even-indexed samples and odd-indexed samples, this method including at least one iteration which contains an operation of modifying even-indexed samples by a function of weighted odd-indexed samples, an operation of modifying odd-indexed samples by a function of weighted even-indexed samples, the weighted samples being obtained by at least one weighting operation, this method being remarkable in that at least one of the weighting operations is applied to the difference between two consecutive even-indexed samples.

Thus, the present invention allows notably the implementation by lifting of any pairs of HSS/HSA wavelet filters, and the implementation by lifting of any pair of orthogonal filters and the implementation by lifting of any pair of any wavelet filters with equal support.

The invention also makes it possible, by virtue of the technique of filtering by lifting, to reduce the number of filtering operations (multiplications and additions) compared with a conventional convolution filtering and also guarantees the reversible character of the wavelet transformations, that is to say a perfect reconstruction of the signal, in the case of signals whose sample values are integer.

According to a particular characteristic, the operation of modifying odd-indexed samples is performed following the operation of modifying even-indexed samples.

In a particular embodiment, the aforementioned iteration consists notably of:

weighting, by means of a first weighting coefficient, at least one odd-indexed sample adjacent to an even sample currently being modified, so as to obtain a weighted odd-indexed sample, modifying at least one even-indexed sample using at least one weighted odd-indexed sample, weighting, by means of a second weighting coefficient, even-indexed samples adjacent to an odd sample currently being modified, so as to obtain weighted even-indexed samples, and modifying at least one odd-indexed sample using at least one weighted even-indexed sample.

"Adjacent" sample means a sample whose rank is consecutive with the sample in question.

According to a particular characteristic, the second weighting coefficient is a function of the first weighting coefficient.

The second weighting coefficient can for example depend on the first weighting coefficient as follows:

$$\beta_{0,j} = m_j \bigg/ \bigg(1 - 2\sum_{i=0}^{j} \alpha_{0,i}\bigg)$$

where $\alpha_{0,i}$ designates the first weighting coefficient, $\beta_{0,j}$ designates the second weighting coefficient, i and j are integers and $m_j$ is a value defined by the recurrence $m0=(-1)^{L_0}$ and $m_j=-m_{j-1}$, $L_0$ being a predetermined integer.

According to a particular characteristic, at each iteration, the odd-indexed sample adjacent to the even sample currently being modified is alternately the sample of rank immediately lower or immediately higher.

According to a particular characteristic, the filtering method includes, at the end of the aforementioned iteration, an additional filtering step including an operation of weighting by means of a third weighting coefficient.

According to a particular characteristic, the third weighting coefficient is a function of the weighting coefficient used at the previous step, as follows:

$$\gamma = -1/(2\beta_{0,L_0-1})$$

where $\gamma$ designates the third weighting coefficient, $L_0$ is a predetermined parameter and $\beta_{0,L_0-1}$ designates the weighting coefficient used at the previous step.

In the application of the invention to the filtering of digital images, the input digital signal represents an image.

According to a second aspect, the present invention also proposes a filtering method adapted to transform one or more input digital signals into an output digital signal, the input signals including even-indexed samples and odd-indexed samples, the method including at least one iteration which contains an operation of modifying odd-indexed samples by means of a function of weighted even-indexed samples, an operation of modifying even-indexed samples by means of a function of weighted odd-indexed samples, the weighted samples being obtained by means of at least one weighting operation, this method being remarkable in that at least one of the weighting operations is applied to the difference between two consecutive even-indexed samples.

According to a particular characteristic, the operation of modifying even-indexed samples is performed following the operation of modifying odd-indexed samples.

In a particular embodiment, the aforementioned iteration consists notably of:

weighting, by means of a fourth weighting coefficient, even-indexed samples adjacent to an odd sample currently being modified, so as to obtain weighted even-indexed samples, modifying at least one odd-indexed sample using at least one weighted even-indexed sample, weighting, by means of a fifth weighting coefficient, at least one odd-indexed sample adjacent to an even sample currently being modified, so as to obtain a weighted odd-indexed sample, and modifying at least one even-indexed sample using at least one weighted odd-indexed sample.

According to a particular characteristic, the fourth weighting coefficient is a function of the fifth weighting coefficient.

The fourth weighting coefficient can for example depend on the fifth weighting coefficient as follows:

$$\beta_{0,j} = m_j \bigg/ \bigg(1 - 2\sum_{i=0}^{j} \alpha_{0,i}\bigg)$$

where $\alpha_{0,i}$ designates the fifth weighting coefficient, $\beta_{0,j}$ designates the fourth weighting coefficient, i and j are integer and $m_j$ is a value defined by the recurrence $m_0=(-1)^{L_0}$ and $m_j=-m_{j-1}$, $L_0$ being a predetermined integer.

According to the second aspect of the invention, according to a particular characteristic, at each iteration, the odd-indexed sample adjacent to the even sample currently being modified is alternately the sample of rank immediately lower or immediately higher.

According to the second aspect of the invention, according to a particular characteristic, the filtering method includes, at the end of the aforementioned iteration, an additional filtering step including an operation of weighting by means of a sixth weighting coefficient.

According to a particular characteristic, the sixth weighting coefficient is a function of the weighting coefficient used at the previous step, as follows:

$$\gamma = -1/(2\beta_{0,L_0-1})$$

where $\gamma$ designates the sixth weighting coefficient, $L_0$ is a predetermined parameter and $\beta_{0,L_0-1}$ designates the weighting coefficient used at the previous step.

In the application of the invention to the filtering of digital images, the output digital signal represents an image.

According to a particular characteristic of the first and second aspects of the invention, the modification operations consist of applying an approximation function.

This function may be:

the identity function, or a function of a real variable which supplies the integer closest to the variable, or a function of a real variable which supplies the first integer below the variable, or a function of a real variable which supplies the first integer above the variable, or a function of a variable decomposed into subvariables whose sum is equal to the variable, which supplies a sum of approximate values of the subvariables, each of the approximate values of the subvariables being either a function of a real variable which supplies the integer closest to the variable, or a function of a real variable which supplies the first integer below the variable, or a function of a real variable which supplies the first integer above the variable.

The invention also relates to a signal processing device which has means adapted to implement a filtering method as above.

For the same purpose as indicated above, the present invention also proposes, according to a third aspect, a digital filtering device adapted to transform an input digital signal into one or more output digital signals containing even-indexed samples and odd-indexed samples, this filter having at least one weighting module, a module for modifying even-indexed samples by means of a function of weighted odd-indexed samples, a module for modifying odd-indexed samples by means of a function of weighted even-indexed samples, these weighted samples being supplied by the weighting module, the modification modules functioning iteratively, so as to modify even-indexed samples at least once and then odd-indexed samples at least once, this filtering device being remarkable in that at least one of the aforementioned weighting modules receives as an input the difference between two consecutive even-indexed samples.

For the same purpose as indicated above, the present invention also proposes, according to a fourth aspect, a digital filtering device adapted to transform one or more input digital signals into an output digital signal, the input signals containing even-indexed samples and odd-indexed samples, this filtering device having at least one weighting module, a module for modifying odd-indexed samples by means of a function of weighted even-indexed samples, a module for modifying even-indexed samples by means of a function of weighted odd-indexed samples, the weighted samples being supplied by the weighting module, the modification module functioning iteratively, so as to modify odd-indexed samples at least once and then even-indexed samples at least once, this filtering device being remarkable in that at least one of the aforementioned weighting modules receives as an input the difference between two consecutive even-indexed samples.

The particular characteristics and the advantages of the filtering device being similar to those of the filtering method according to the invention, they are not stated here.

Still with the same purpose, the invention also proposes a signal processing device including a filtering device as previously defined, or the means of implementing the corresponding method.

The invention also concerns a signal processing device including at least two filtering devices as previously defined, the output signal of one of the filtering devices being the input signal of the other filtering device.

The invention also concerns a digital apparatus including the signal processing device.

The invention also concerns a digital photographic apparatus including the signal processing device.

Still for the same purpose, the present invention also proposes an encoding method including steps adapted to implement a filtering method as above.

Still for the same purpose, the present invention also proposes an encoding device including at least one filtering device as above, or the means of implementing the corresponding method.

Still for the same purpose, the present invention also proposes a digital signal compression method, including steps adapted to implement a filtering method as above.

Still for the same purpose, the present invention also proposes a digital signal compression device, including at least one filtering device as above, or the means of implementing the corresponding method.

An information storage means which can be read by a computer or by a microprocessor, integrated or not into the device, possibly removable, stores a program implementing a filtering method as above.

The present invention also relates to a computer program product containing sequences of instructions for implementing a filtering method as above.

As the particular characteristics and the advantages of the signal processing devices, of the digital apparatus, of the digital photographic apparatus, of the encoding and compression devices and methods, of the storage means and of the computer program product are similar to those of the filtering method according to the invention, they are not stated here.

Other aspects and advantages of the invention will emerge from a reading of the following detailed description of a particular embodiment, given by way of non-limitative example. The description refers to the drawings which accompany it.

DETAILED DESCRIPTION OF THE INVENTION

Figure 1:
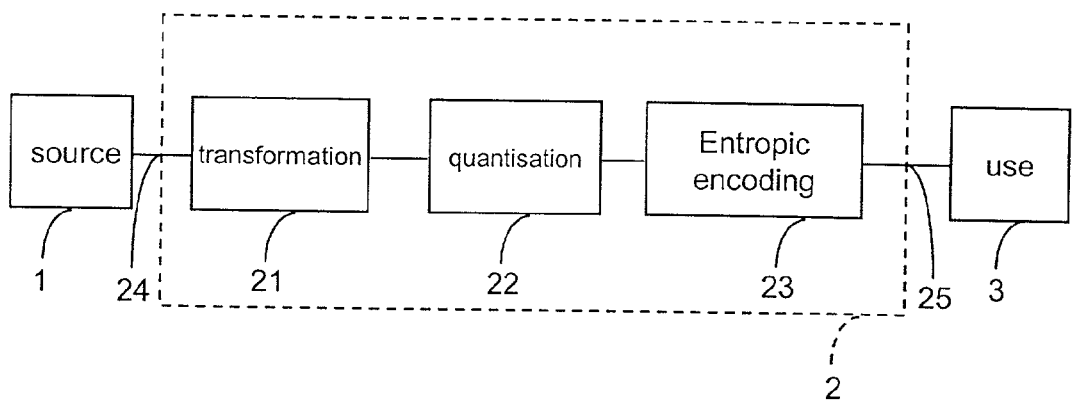
FIG. 1 depicts schematically a data processing device according to the invention.

According to a chosen embodiment depicted in FIG. 1, a data processing device according to the invention is a data encoding device 2 which has an input 24 to which a source 1 of non-encoded data is connected. The data processing device can be integrated into a digital apparatus, such as a computer, a digital photographic apparatus or a facsimile machine, for example.

The source 1 has for example a memory means, such as a random access memory, hard disk, diskette or compact disc, for storing non-encoded data, this memory means being associated with an appropriate reading means for reading the data therein. A means for recording the data in the memory means can also be provided. The source 1 can also be integrated into the digital apparatus.

It will be considered more particularly hereinafter that the data to be encoded are a series of digital samples representing an image IM.

The source 1 supplies a digital image signal SI at the input of the encoding circuit 2. The image signal SI is a series of digital words, for example bytes. Each byte value represents a pixel of the image IM, here with 256 levels of grey, or black and white image. The image can be a multispectral image, for example a colour image having components in three frequency bands, of the red-green-blue or luminance and chrominance type. Each band is then processed in a similar manner to the monospectral image.

Means 3 using encoded data are connected at the output 25 of the encoding device 2.

The user means 3 include for example means of storing encoded data, and/or means of transmitting encoded data.

The encoding device 2 has conventionally, as from the input 24, a transformation circuit 21, to which the present invention more particularly relates, and an example embodiment of which will be detailed hereinafter. The transformations envisaged here are decompositions of the data signal into frequency sub-bands, so as to effect an analysis of the signal.

The transformation circuit 21 is connected to a quantisation circuit 22. The quantisation circuit implements a quantisation known per se, for example a scalar quantisation, or a vector quantisation, of the coefficients, or groups of coefficients, of the frequency sub-bands supplied by the circuit 21.

The circuit 22 is connected to an entropic encoding circuit 23, which effects an entropic encoding, for example a Huffman encoding, or an arithmetic encoding, of the data quantised by the circuit 22.

Figure 2:
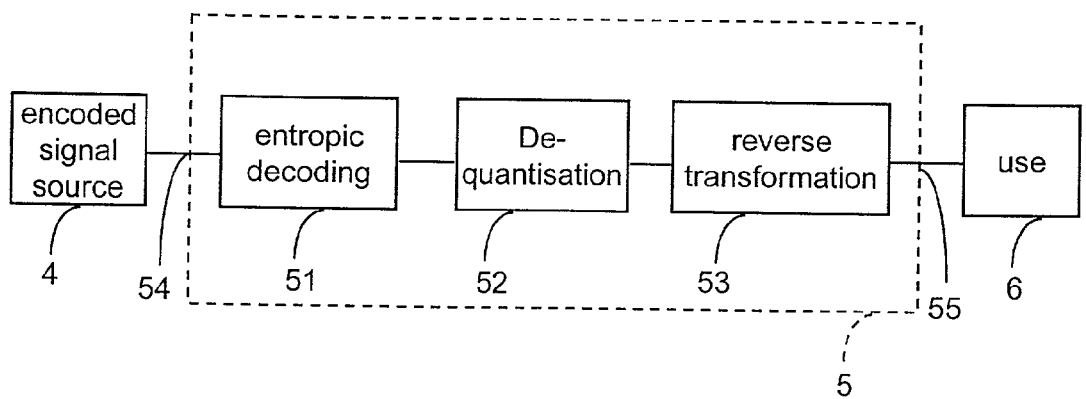
FIG. 2 depicts schematically another data processing device according to the invention.

FIG. 2 depicts another data processing device according to the invention, in the form of a device 5 for decoding data encoded by the device 2.

Means 4 using encoded data are connected at the input 54 of the decoding device 5. The means 4 include for example means of storing encoded data, and/or means for receiving encoded data which are adapted to receive the encoded data transmitted by the transmission means 3.

Means 6 using decoded data are connected at the output 55 of the decoding device 5. The user means 6 are for example image display means, or sound reproduction means, according to the nature of the data being processed.

The decoding device 5 overall performs operations which are the reverse of those of the encoding device 2. The device 5 has an entropic decoding circuit 51, which performs an entropic decoding corresponding to the encoding of the circuit 23. The circuit 51 is connected to a dequantisation circuit 52, corresponding to the quantisation circuit 22.

The circuit 52 is connected to a reverse transformation circuit 53, corresponding to the transformation circuit 21. The present invention relates more particularly to the reverse transformation circuit 53. An example embodiment will be detailed hereinafter. The transformations envisaged here effect a synthesis of the digital signal, from frequency sub-bands.

The encoding device and the decoding device can be integrated into the same digital apparatus, for example a digital camera. In this case, the data processing device effects the encoding and the decoding of the data.

Figure 3:
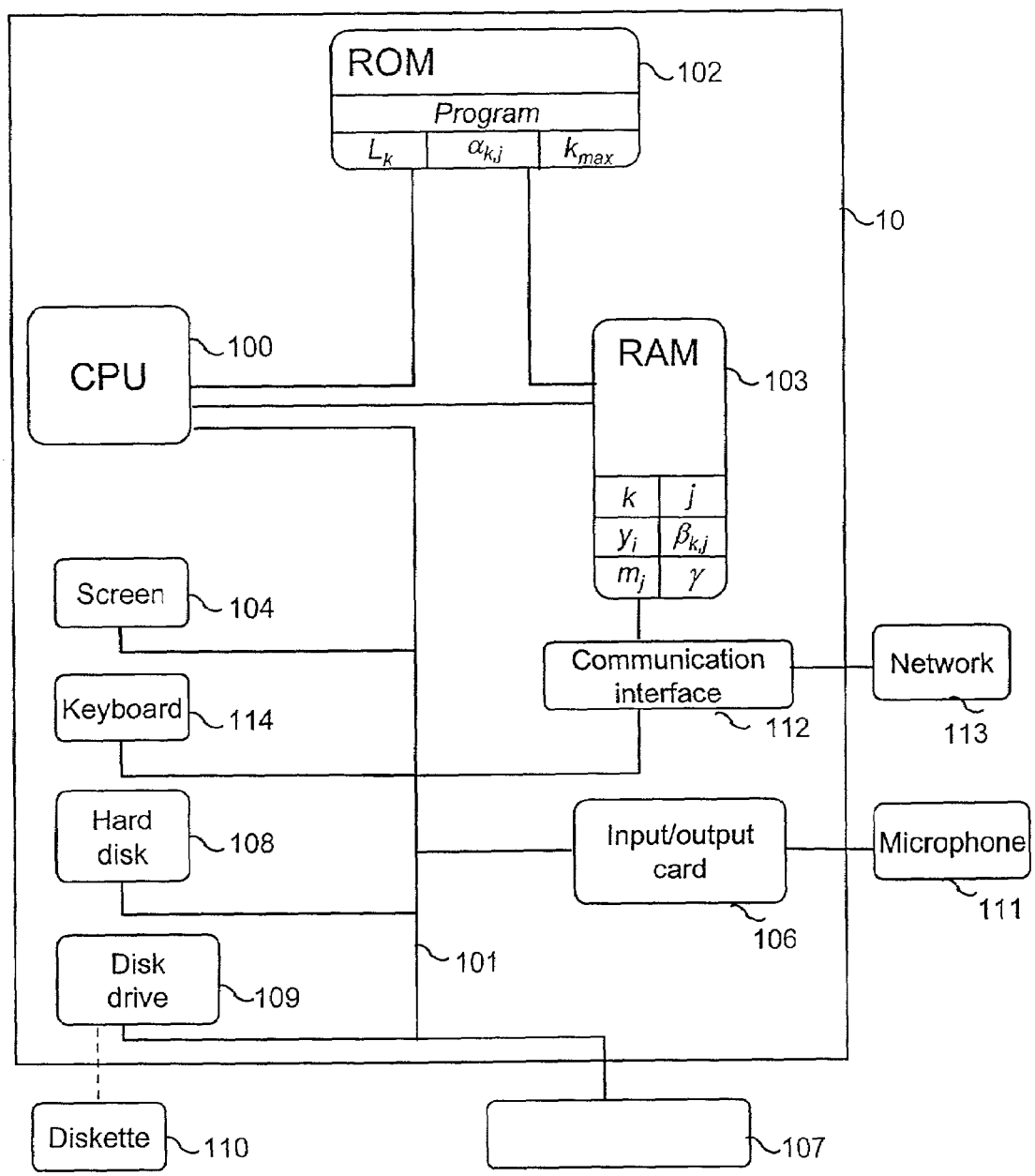
FIG. 3 depicts an embodiment of the data processing device according to the invention.

With reference to FIG. 3, an example of a device 10 implementing the invention is described. This device is adapted to transform a digital signal and, according to the examples developed hereinafter, to analyse it or to synthesise it or to analyse and then synthesise it. Thus FIG. 3 illustrates an encoding or decoding device.

The device 10 is here a microcomputer having a communication bus 101 to which there are connected:

a central processing unit 100,
a read-only memory 102,
a random access memory 103,
a screen 104,
a keyboard 114,
a hard disk 108,
a disk drive 109 adapted to receive a diskette 110,
an interface 112 for communication with a communication network 113,
an input/output card 106 connected to a microphone 111.

The random access memory 103 stores data, variables and intermediate processing results, in memory registers bearing, in the description, the same names as the data whose values they store. The random access memory 103 contains notably:

a register "k", containing the current value of the variable k defined below, a register "j", containing the current value of the variable j defined below, a register "$y_i$", in which there are stored the values of the samples $y_i$ of the transformed image as they are calculated, a register "$\beta_{k,j}$", in which there are stored the values of the weighting coefficients $\beta_{k,j}$ defined below, a register "$m_j$", in which there are stored the values of the parameters $m_j$ defined below, a register "γ", in which there are stored the values of the coefficients γ defined below.

In the case where FIG. 3 illustrates an encoding device, the read-only memory 102 is adapted to store notably:

the operating program of the central processing unit 100, in a register "Program", the maximum value $k_{max}$ of the variable k, in a register "$k_{max}$", the value of the parameters $L_k$, defined below, for all the values of the variable k between 0 and $k_{max}$, in a register "$L_k$", the values of the weighting coefficients $\alpha_{k,j}$, in a register "$\alpha_{k,j}$".

It should be noted that, in the case where FIG. 3 illustrates a decoding device, the register program is also in read-only memory but the registers "$k_{max}$", "$L_k$" and "$\alpha_{k,j}$" are in random access memory.

Figure 5:
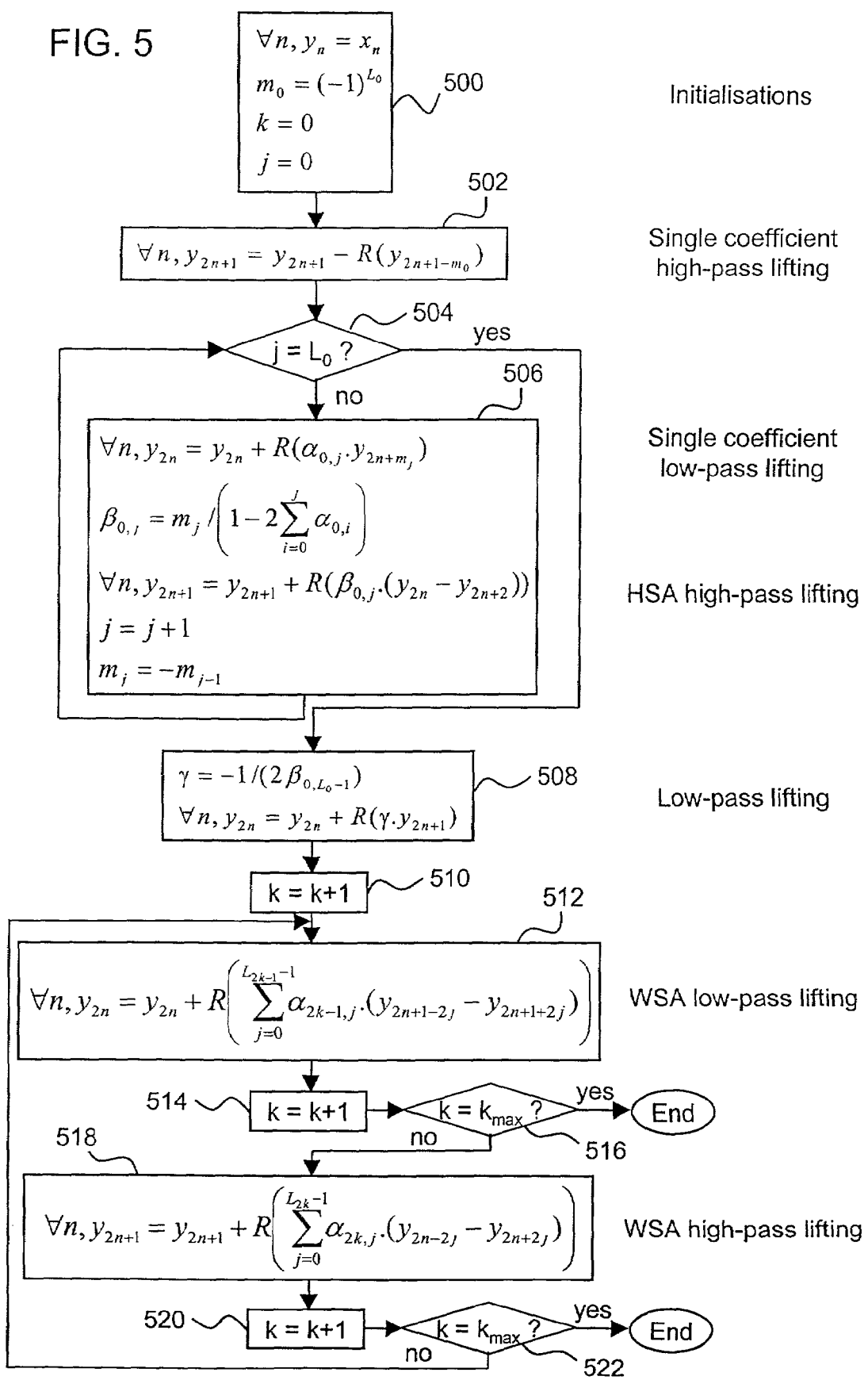
FIG. 5 is a flow diagram illustrating the principal steps of a filtering method according to the present invention, in a first particular embodiment.
Figure 7:
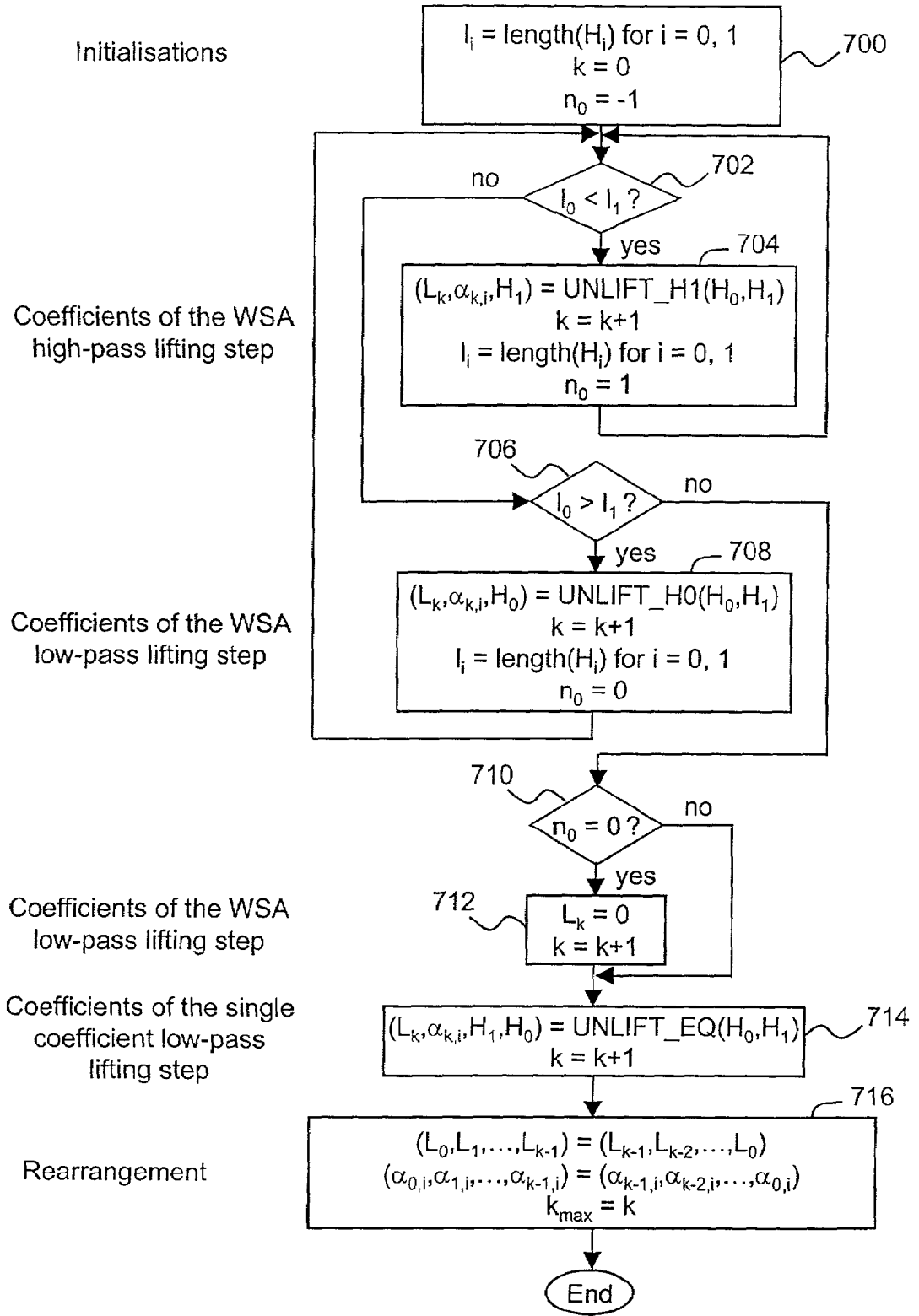
FIG. 7 is a flow diagram illustrating a method of carrying out the determination of the lifting parameters from the coefficients of the wavelet filters.

The central processing unit 100 is adapted to implement the flow diagrams in FIGS. 5 and 7.

The hard disk 108 stores the programs implementing the invention, as well as the data to be encoded and the encoded data according to the invention. These programs can also be read on the diskette 110, or received via the communication network 113, or stored in read-only memory 102.

In more general terms, the programs according to the present invention are stored in a storage means. This storage means can be read by a computer or by a microprocessor. This storage means is integrated or not into the device, and may be removable. For example, it may include a magnetic tape, a diskette or a CD-ROM (fixed-memory compact disc).

The device 10 can receive data to be encoded coming from a peripheral device 107, such as a digital photographic apparatus, or a scanner, or any other means of acquiring or storing data.

The device 10 can also receive data to be encoded coming from a distant device, via the communication network 113, and transmit encoded data to a distant device, again via the communication network 113.

The device 10 can also receive data to be encoded coming from the microphone 111. These data are then a sound signal.

The screen 104 enables a user notably to display the data to be encoded, and serves, with the keyboard 114, as a user interface.

Figure 4:
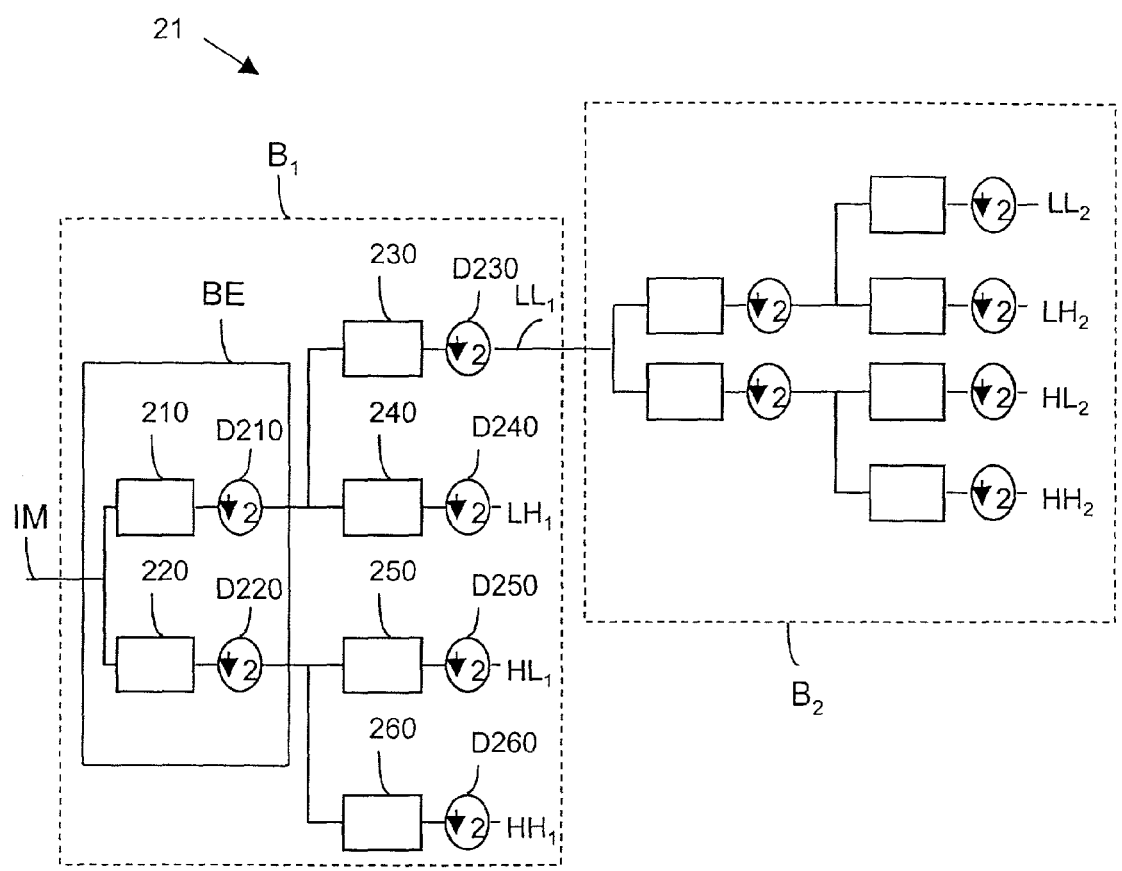
FIG. 4 depicts an embodiment of a transformation circuit included in the data processing device of FIG. 1.

With reference to FIG. 4, the transformation circuit 21, or analysis circuit, is a dyadic decomposition circuit with two levels. The circuit 21 is, in this embodiment, a conventional set of filters, respectively associated with decimators by two, which filter the image signal in two directions, respectively vertical and horizontal, into sub-band signals of high and low spatial frequencies. The relationship between a high-pass filter and a low-pass filter is determined by the conditions of perfect reconstruction of the signal. Different examples of filters will be envisaged hereinafter. It should be noted that the vertical and horizontal decomposition filters are not necessarily identical, although in practice this is generally the case. The circuit 21 has here two successive analysis units B1 and B2 for decomposing an image IM into sub-band signals according to two resolution levels.

In general terms, the resolution of a signal is the number of samples per unit length used for representing this signal. In the case of an image signal, the resolution of a sub-band signal is related to the number of samples per unit length used for representing this sub-band signal horizontally and vertically. The resolution depends on the number of decimations carried out, on the decimation factor and on the resolution of the initial image.

The first analysis unit B1 receives a digital image signal and applies it to digital filters, respectively low-pass and high-pass 210 and 220, which filter the image signal in a first direction, for example horizontal in the case of an image signal. After passing through decimators by two D210 and D220, the resulting filtered signals are respectively applied to two low-pass filters 230 and 250 and high-pass filters 240 and 260, which filter them in a second direction, for example vertical in the case of an image signal. Each resulting filtered signal passes through a respective decimator by two D230, D240, D250 and D260. The unit B1 outputs four sub-bands signals $LL_1$, $LH_1$, $HL_1$ and $HH_1$ with the highest resolution $RES_1$ in the decomposition.

The sub-band signal $LL_1$ contains components, or coefficients, of low frequency, in both directions, of the image signal. The sub-band signal $LH_1$ contains the components of low frequency in a first direction and of high frequency in a second direction, of the image signal. The sub-band signal $HL_1$ contains the components of high frequency in the first direction and the components of low frequency in the second direction. Finally, the sub-band signal $HH_1$ contains the components of high frequency in both directions.

Each sub-band signal is a set of real coefficients constructed from the original image, which contains information corresponding to an orientation which is respectively vertical, horizontal and diagonal of the contours of the image, in a given frequency band. Each sub-band signal can be assimilated to an image.

The sub-band signal $LL_1$ is analysed by the analysis unit B2 similar to the previous one in order to supply four sub-band signals $LL_2$, $LH_2$, $HL_2$ and $HH_2$ of resolution level $RES_2$.

Each of the sub-band signals of resolution $RES_2$ also corresponds to an orientation in the image.

To a given analysis circuit 21 there corresponds, in a conventional manner, a synthesis circuit whose structure is derived from that of the analysis circuit.

FIG. 5 shows the succession of lifting steps implementing the forward wavelet transformation according to the present invention. The reverse transformation will be described next in relation to FIG. 6.

An input signal $x_n$ to be transformed is considered, having samples whose ranks are between two integers $i_0$ and $i_1$ (excluding $i_1$), into an output signal $y_n$ having samples whose ranks are between $i_0$ and $i_1$ (excluding $i_1$).

An initialisation step 500 consists first of all of setting the value of the samples of the output signal $y_n$ to that of the samples of the input signal $x_n$.

During step 500, two counters, whose current value will be denoted respectively k and j, are also initialised to the value 0.

During step 500, the parameter $m_j$, mentioned above in relation to FIG. 3, is also initialised, to a value $m_0=(-1)^{L_0}$, where $L_0$ is another parameter, defined below.

If a signal $y_n$ is considered, having samples whose ranks are between $i_0$ and $i_1$ (excluding $i_1$), the signal $y_n$ must be extended beyond this range, sufficiently for all the samples of the output signal $y_n$ whose ranks are between $i_0$ and $i_1$ (excluding $i_1$) to be able to be calculated. This will emerge from the description of an example, given below.

Thus a signal extension procedure (not depicted in FIG. 5) consists of calculating the values of the output signal $y_i$ for values of i leaving a predetermined interval $i_0 \leq i < i_1$:

$$y_i = y_{PSE(i,i_0,i_1)} \quad (14)$$

where $$PSE(i,i_0,i_1)) = i_0 + \min[\mod(i-i_0, 2(i_1-i_0)), 2(i_1-i_0) - \mod(i-i_0, 2(i_1-i_0))] \quad (15)$$

where min(a,b) designates the function supplying the smaller of the values a and b and mod(a,b) designates the integer lying between 0 and b−1 (including b−1) equal to the value of a, to within a multiple of b.

The example, in no way limitative, of an extension procedure given above applies to signals such that the rows $i_0$ and $i_1$ are even. Other extension procedures can be used in the case where at least one of the rows $i_0$ and $i_1$ is odd. Nevertheless the remainder of the description applies to all parity cases. Moreover, there are other extension procedures for other types of filter, such as for example the so-called circular extension, known to a person skilled in the art, for orthogonal filters.

The following step 502 of the filtering method is the first lifting step. This is a high-pass lifting step.

In a preferred embodiment, this lifting step is either of the LSC or of the RSC type, according to the value of the parameter $m_0 = (-1)^{L_0}$, and is defined by:

$$\forall n, y_{2n+1} = y_{2n+1} - R(y_{2n+1-m_0}) \quad (16)$$

This lifting step corresponds to the HSA high-pass filter $H_1(z) = z-1$ or $1-z$, according to the value of $m_0$. It corresponds to an increase by one unit of the support of the equivalent high-pass filter.

At the end of the lifting step 502, a test 504 is carried out in order to determine whether or not the value of the counter j is equal to $L_0$.

As long as the result of the test 504 is negative, a step 506 is iterated, which consists essentially of a sequence of operations of modifying and weighting the even-indexed or odd-indexed samples of the signal $y_n$.

This is because, during the step 506, a succession of $L_0$ pairs of lifting steps are effected, corresponding to values of the counter j between 0 and 0 and $L_0-1$, where the first lifting step is a single coefficient low-pass lifting step:

$$\forall n, y_{2n} = y_{2n} + R(\alpha_{0,j} \cdot y_{2n+m_j}) \quad (17)$$

and where the second lifting step is a HSA high-pass lifting step:

$$\forall n, y_{2n+1} = y_{2n+1} + R(\beta_{0,j} \cdot (y_{2n} - y_{2n+2})) \quad (18)$$

The non-zero parameter $\alpha_{0,j}$ used in equation (17) is a function of the coefficients of the pair of wavelet filters ($H_0$, $H_1$) and its calculation is detailed below.

Given that the value of $m_j$ is either −1 or +1 as will be seen, the rank of the sample $y_{2n+m_j}$ is either 2n−1 or 2n+1, that is to say an integer following on from the rank of the sample $y_{2n}$ currently being modified. It is said that the odd-indexed sample $y_{2n+m_j}$ is adjacent to the sample $y_{2n}$.

The single coefficient low-pass lifting step is either of the LSC or RSC type, according to the value of the parameter $m_j$, which is defined recursively by: $m_j = -m_{j-1}$.

There is a systematic alternation of the following single coefficient low-pass lifting steps (that is to say corresponding to following values of j): for example, the second is of the LSC type if the first is of the RSC type or vice versa. The last single coefficient low-pass lifting step is always of the LSC type.

The low-pass lifting step of equation (17) guarantees that the support of the equivalent low-pass filter increases until it reaches the value of the support of the equivalent high-pass filter of the previous high-pass lifting step, i.e. the closest higher even value.

In accordance with a preferred embodiment of the present invention, the high-pass lifting step of equation (18) is of the HSA type, unlike the prior art, which uses solely single coefficient lifting steps and WSA lifting steps for the implementation by lifting of HSS/HSA wavelet filters.

The high-pass lifting step of equation (18) guarantees that the support of the equivalent high-pass filter increases by a value of two (that is to say until it reaches the closest higher even value) with respect to the support of the equivalent high-pass filter of the previous high-pass lifting step.

The equivalent high-pass filter of the high-pass lifting step of equation (18) is of the HSA type if and only if the equivalent high-pass filter of the previous high-pass lifting step is HSA and the non-zero parameter $\beta_{0,j}$ used in equation (18) is a function of the parameter $m_j$ and of the parameters $\alpha_{0,i}$ originating from the previous single coefficient low-pass lifting steps, this function being for example defined as follows:

$$\beta_{0,j} = m_j \Big/ \left(1 - 2\sum_{i=0}^{j} \alpha_{0,i}\right) \quad (19)$$

Unlike the low-pass lifting step of equation (17), which lifts the low-pass coefficients from the high-pass coefficients alternately to left and right, the high-pass lifting step of equation (18) lifts the high-pass coefficients from both the left-side and right-side low-pass coefficients.

When the result of test 504 is positive, that is to say $j = L_0$, the alternation of SC low-pass and HSA high-pass lifting steps ends and is followed by an RSC low-pass lifting step 508, defined by:

$$\forall n, y_{2n} = y_{2n} + R(\gamma \cdot y_{2n+1}) \quad (20)$$

In a preferred embodiment, the coefficient $\gamma$ is calculated according to the weighting coefficient used at the previous high-pass lifting step:

$$\gamma = -1/(2\beta_{0,L_0-1}) \quad (21)$$

in order to guarantee that the corresponding low-pass filter is HSS.

The low-pass lifting step 508 guarantees that the support of the equivalent low-pass filter increases until it reaches the value of the support of the equivalent high-pass filter of the previous high-pass lifting step, that is to say, in the preferred embodiment described here, the closest higher even integer.

In this preferred embodiment, there is obtained, at the end of step 508, a corresponding pair of low-pass and high-pass filters which have equal even supports and which are respectively HSS and HSA.

Next an iteration is carried out of steps of WSA low-pass (step 512) and WSA high-pass (step 518) lifting, that is to say $k_{max}$− WSA lifting steps in total, the value of the counter k increasing from 1 to $k_{max}$−.

For this purpose, following step 508, the value of a counter k is incremented by one unit at step 510. The value of k is incremented once again after each passage through step 512 (see step 514 in FIG. 5) and after each passage through step 518 (see step 520 in FIG. 5).

Steps 512, 514, 518 and 520 are reiterated until the value of k is equal to $k_{max}$ (see tests 516 and 522 on the value of k, respectively carried out after the incrementation steps 514 and 520).

The WSA low-pass lifting steps 512 are defined by:

$$\forall n, y_{2n} = y_{2n} + R\left(\sum_{j=0}^{L_{2k-1}-1} \alpha_{2k-1,j} \cdot (y_{2n+1-2j} - y_{2n+1+2j})\right) \quad (22)$$

and the WSA high-pass lifting steps 518 are defined by:

$$\forall n, y_{2n+1} = y_{2n+1} + R\left(\sum_{j=0}^{L_{2k}-1} \alpha_{2k,j} \cdot (y_{2n-2j} - y_{2n+2j})\right) \quad (23)$$

These steps are known per se. Their effect is an increase in the size of the corresponding filter (low-pass for step 512 and high-pass for step 518) by a multiple of four.

In order to produce wavelet filters with a unity direct current gain and a Nyquist gain of 2, that is to say with a so-called (1,2) normalisation, no specific normalisation step of the type $y_i = G \cdot y_i$, where G is a real value, is necessary. On the other hand, if a different normalisation is required, such as a $(G_1, 2G_2)$ normalisation with a DC gain of $G_1$ and a Nyquist gain of $2G_2$, a final normalisation step is necessary: $y_{2n} = G_1 \cdot y_{2n}$ and $y_{2n+1} = G_2 \cdot y_{2n+1}$.

The approximation function R is not necessarily the same for all the lifting steps for which it is used.

The parameters to be chosen for the lifting implementation of the HSS/HSA filters are $L_k$, $\alpha_{k,j}$, $k_{max}$ and the function R at each lifting step. It is thus possible to establish a one-to-one mapping between these parameters and the coefficients and lengths of any pair of perfect reconstruction HSS/HSA wavelet filters.

Figure 6:
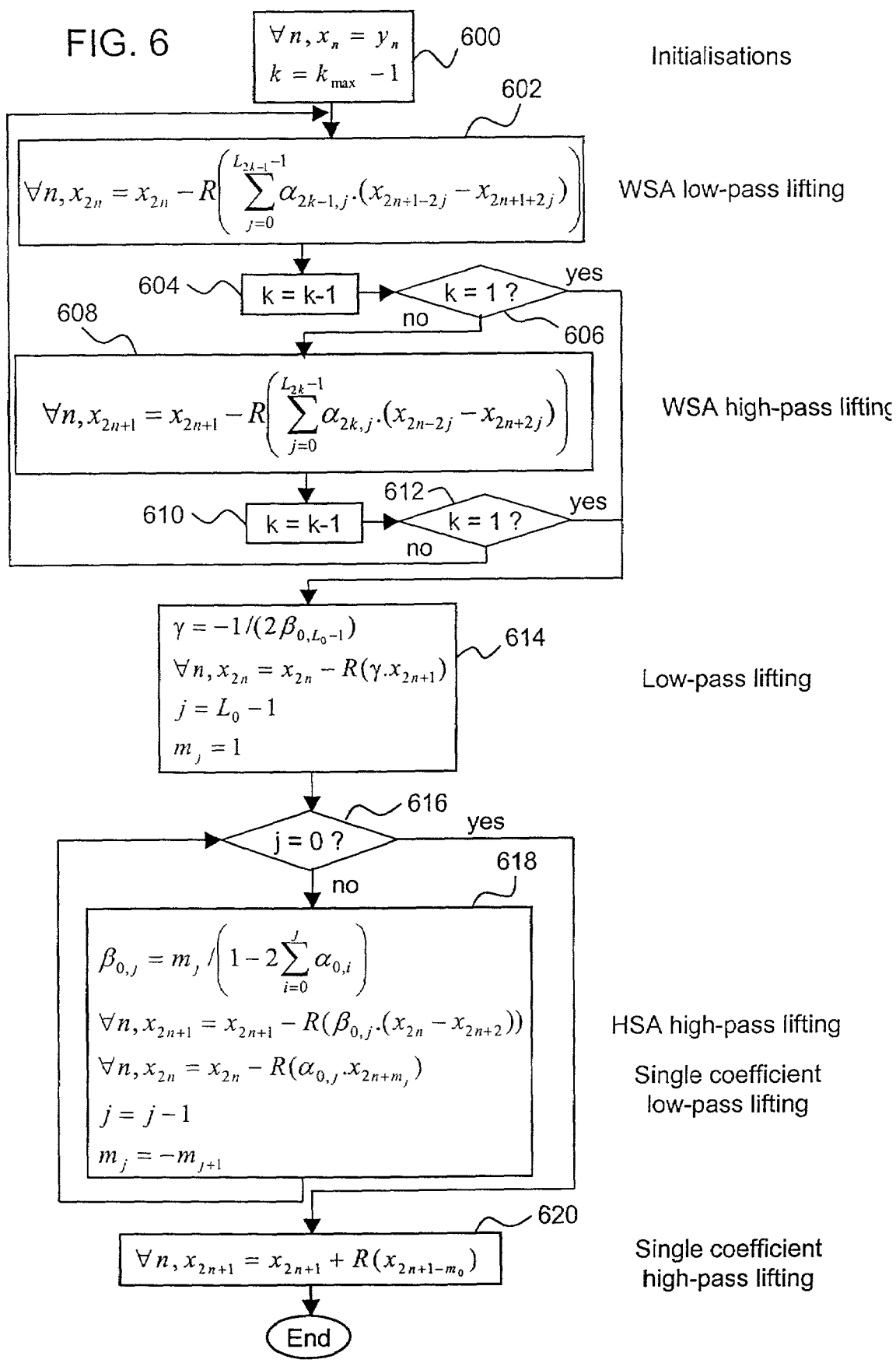
FIG. 6 is a flow diagram illustrating the principal steps of a filtering method according to the present invention, in a second particular embodiment.

FIG. 6 shows the succession of lifting steps implementing the reverse wavelet transformation in accordance with the present invention.

An input signal $y_n$ to be transformed is considered, having samples whose ranks lie between two integers $i_0$ and $i_1$ (not including $i_1$) and an output signal $x_n$ having samples whose ranks lie between $i_0$ and $i_1$ (not including $i_1$).

An initialisation step 600 consists first of all of setting the value of the samples of the output signal $x_n$ to that of the samples of the input signal $y_n$.

All the steps of the reverse lifting implementation are the operations which are the reverse of the lifting steps performed in forward transformation. Moreover, the steps of the reverse lifting implementation are performed in the opposite order to the steps of the forward lifting implementation.

For an analysis processing followed by a synthesis processing of the same signals, all the parameters of the reverse transformation are identical to those chosen for the forward transformation.

As shown by FIG. 6, during the initialisation step 600, a counter, whose current value is denoted k, is also initialised to the value $k_{max}-1$.

If a signal $x_n$ is considered, having samples whose ranks lie between $i_0$ and $i_1$ (not including $i_1$), the signal $x_n$ must be extended beyond this range, sufficiently for all the samples of the output signal $x_n$ whose ranks are between $i_0$ and $i_1$ (not including $i_1$) being able to be calculated. This will emerge from the description of an example, given below.

Thus a signal extension procedure (not depicted in FIG. 6) consists of calculating the values of the output signal $x_i$ for values of i leaving a predetermined interval $i_0 \leq i < i_1$, as defined by equation (24) below for values of i such that $\mod(i-i_0, 2(i_1-i_0)) < i_1 - i_0$:

$$x_i = x_{i_0 + \mod(i-i_0, 2(i_1-i_0))} \quad (24)$$

where mod(a,b) designates the integer lying between 0 and b−1 (including b−1) equal to the value of a, to within a multiple of b, as defined by equation (25) below for even values of i such that $\mod(i-i_0, 2(i_1-i_0)) \geq i_1 - i_0$:

$$x_i = x_{i_0 + \mod(2(i_1-i_0)-1-(i-i_0), 2(i_1-i_0))} \quad (25)$$

and as defined by equation (26) below for odd values of i such that $\mod(i-i_0, 2(i_1-i_0)) \geq i_1 - i_0$:

$$x_i = x_{i_0 + \mod(2(i_1-i_0)-(i-i_0), 2(i_1-i_0))} \quad (26)$$

There are other extension procedures for other types of filter, such as for example the so-called circular extension, known to a person skilled in the art, for orthogonal filters.

In order to implement wavelet filters with a unity DC gain and a Nyquist gain of 2, that is to say with a so-called (1,2) normalisation, no specific normalisation step of the type $x_i = G \cdot x_i$, where G is a real value, is necessary. On the other hand, if a different normalisation is required, such as a $(G_1, 2G_2)$ normalisation with a DC gain of $G_1$ and a Nyquist gain of $2G_2$, a reverse normalisation step is necessary: $x_{2n} = (1/G_1) \cdot x_{2n}$ and $x_{2n+1} = (1/G_2) \cdot x_{2n+1}$.

As shown in FIG. 6, an iteration of steps of WSA low-pass lifting (step 602) and WSA high-pass lifting (step 608) is carried out, that is to say $k_{max}-1$ WSA lifting steps in total, the value of the counter k decreasing from $k_{max}-1$ to 1.

For this purpose, the value of the counter k is decremented by one unit after each passage through step 602 (see step 604 in FIG. 6) and after each passage through step 608 (see step 610 in FIG. 6).

Steps 602, 604, 608 and 610 are reiterated until the value of k is equal to 1 (see tests 606 and 612 on the value of k, respectively performed after the decrementation steps 604 and 610).

The WSA low-pass lifting steps 602 are defined by:

$$\forall n, x_{2n} = x_{2n} - R\left(\sum_{j=0}^{L_{2k-1}-1} \alpha_{2k-1,j} \cdot (x_{2n+1-2j} - x_{2n+1+2j})\right) \quad (27)$$

and the WSA high-pass lifting steps 608 are defined by:

$$\forall n, x_{2n+1} = x_{2n+1} - R\left(\sum_{j=0}^{L_{2k}-1} \alpha_{2k,j} \cdot (x_{2n-2j} - x_{2n+2j})\right) \quad (28)$$

These steps are known per se.

When the result of test 606 or 612 is positive, that is to say k=1, the alternation of the steps of WSA low-pass lifting and WSA high-pass lifting ends and is followed by a step of RSC low-pass lifting 614, defined by:

$$\forall n, x_{2n} = x_{2n} - R(\gamma \cdot x_{2n+1}) \quad (29)$$

In a preferred embodiment, the coefficient γ is calculated as a function of the weighting coefficient used at the following high-pass lifting step:

$$\gamma = -1/(2\beta_{0, L_0-1}) \quad (30)$$

During step 614, the parameter $m_j$ is also initialised to the value 1 and a counter j to the value $L_0-1$.

At the end of the low-pass lifting step 614, a test 616 is performed in order to determine whether or not the value of the counter j is equal to 0.

As long as the result of test 616 is negative, a step 618 is iterated, which consists essentially of a sequence of operations of modifying and weighting the even-indexed or odd-indexed samples of the signal $x_n$.

This is because, during step 618, a succession of $L_0$ pairs of lifting steps are performed, corresponding to values of a counter j lying between $L_0-1$ and 0, where the first lifting step is a HSA high-pass lifting step:

$$\forall n, x_{2n+1} = x_{2n+1} - R(\beta_{0,j} \cdot (x_{2n} - x_{2n+2})) \quad (31)$$

and where the second lifting step is a single coefficient low-pass lifting step:

$$\forall n, x_{2n} = x_{2n} - R(\alpha_{0,j} \cdot x_{2n+m_j}) \quad (32)$$

When the result of test 616 is positive, that is to say j=0, the last lifting step 620 is performed, which is the reverse of the first high-pass lifting step performed in the forward transformation. In a preferred embodiment, this lifting step is either of the LSC or of the RSC type, according to the value of the parameter $m_0 = (-1)^{L_0}$, and is defined by:

$$\forall n, x_{2n+1} = x_{2n+1} + R(x_{2n+1-m_0}) \quad (33)$$

FIG. 7 illustrates a procedure for determining the lifting parameters for any given pair of HSS/HSA wavelet filters, defined by equations (4), (6) and (7) appearing in the introduction. This procedure also applies to orthogonal filters as well as to any filters, without any particular symmetry, with equal support. The "UNLIFT" procedures appearing below are detailed subsequently.

As shown by FIG. 7, a first step 700 consists of initialising an integer variable k to 0 and a variable $n_0$ to $-1$ and storing, in a variable $l_i$, $i \in \{0, 1\}$, the length, that is to say the number of coefficients, of the intermediate low-pass and high-pass filters $H_0$ and $H_1$, respectively (that is to say the number of coefficients of the so-called equivalent filters).

Then a step 702 consists of testing whether $l_0 < l_1$.

If the result of test 702 is positive, there is performed a step 704 of determining the coefficients of the WSA high-pass lifting step 518 of FIG. 5 by applying a procedure UNLIFT_H1 (see FIG. 8B), at the end of which there are obtained the number of lifting coefficients $L_k$, the $L_k$ coefficients $\alpha_{k,i}$ for $0 \le i < L_k$ and the new intermediate high-pass filter $H_1$.

At step 704, the value of k is also incremented by one unit, the length $l_i$ of the intermediate filter is updated and the value 1 is stored in the variable $n_0$.

If the result of test 702 is negative, a step 706 is performed, consisting of testing whether $l_0 > l_1$.

If the result of test 706 is positive, a step 708 of determining the coefficients of the WSA low-pass lifting step 512 of FIG. 5 is performed by applying a procedure UNLIFT_H0 (see FIG. 8A), at the end of which there are obtained the number of lifting coefficients $L_k$, the $L_k$ coefficients $\alpha_{k,i}$ for $0 \le i < L_k$ and the new intermediate low-pass filter $H_0$.

At step 708, the value of k is also incremented by one unit, the length $l_i$ of the intermediate filter is updated and the value 0 is stored in the variable $n_0$.

If the result of test 706 is negative, a step 710 is performed, consisting of testing whether the variable $n_0$ is zero.

If the result of test 710 is positive, a step 712 is performed, consisting of storing the value 0 in the variable $L_k$ and incrementing the value of k by one unit.

At the end of step 712, or if the result of test 710 is negative, a step 714 of determining the coefficients of the single coefficient low-pass lifting step included in step 506 in FIG. 5 is performed by applying a procedure UNLIFT_EQ (see FIG. 8C), at the end of which the number of lifting coefficients $L_0$ and the $L_0$ coefficients $\alpha_{0,i}$ for $0 \le i < L_0$ are obtained.

At step 714, the value of k is also incremented by one unit.

At the end of step 714, a rearrangement step 716 is performed, consisting of updating the lifting coefficients obtained by reordering them, as follows:

$$(L_0, L_1, \ldots, L_{k-1}) = (L_{k-1}, L_{k-2}, \ldots, L_0)$$

$$(\alpha_{0,i}, \alpha_{1,i}, \ldots, \alpha_{k-1,i}) = (\alpha_{k-1,i}, \alpha_{k-2,i}, \ldots, \alpha_{0,i})$$

During step 716, the value $k_{max}$ is also stored in the variable k.

In summary:

when $l_0 > l_1$, the lifting coefficients are obtained by the procedure UNLIFT_H0($H_0, H_1$), when $l_0 < l_1$, the lifting coefficients are obtained by the procedure UNLIFT_H1($H_0, H_1$) and when $l_0 = l_1$, the lifting coefficients are obtained by the procedure UNLIFT_EQ($H_0, H_1$).

These three procedures are now described in more detail.

Figure 8A:
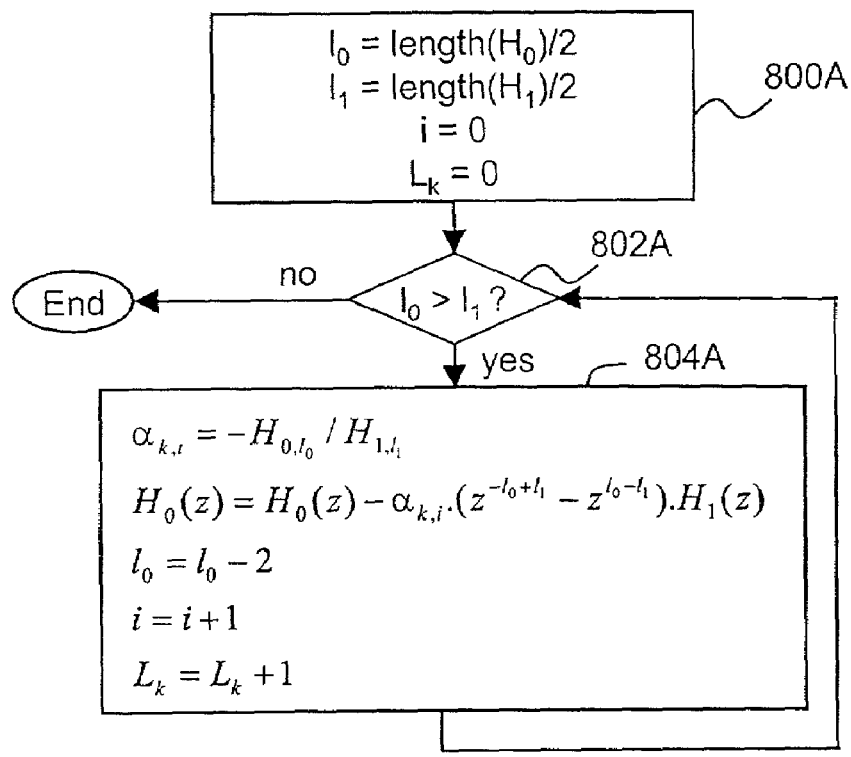
FIGS. 8A, 8B and 8C are flow diagrams illustrating respectively the calculation procedures denoted UNLIFT_H0, UNLIFT_H1 and UNLIFT_EQ acting in the flow diagram of FIG. 7.

As shown by FIG. 8A, which illustrates the procedure UNLIFT_H0, an initialisation step 800A consists of storing in the variable $l_0$ half of the length of $H_0$ and storing in the variable $l_1$ half of the length of $H_1$. During step 800A, a variable i and the variable $L_k$ are also initialised to the value 0.

Then a step 802A consists of testing whether $l_0 > l_1$.

If the result of test 802A is negative, the procedure UNLIFT_H0 is terminated.

If the result of test 802A is positive, a step 804A consists of calculating $\alpha_{k,i}$ and $H_0(z)$, as follows:

$$\alpha_{k,i} = -H_{0,l_0} / H_{1,l_1}$$

$$H_0(z) = H_0(z) - \alpha_{k,i} \cdot (z^{-l_0+l_1} - z^{l_0-l_1}) \cdot H_1(z)$$

At the end of step 804A, the value of $l_0$ is decremented by two units and the value of i and the value of $L_k$ are incremented by one unit.

Then this step 804A is reiterated as long as $l_0 > l_1$.

Figure 8B:
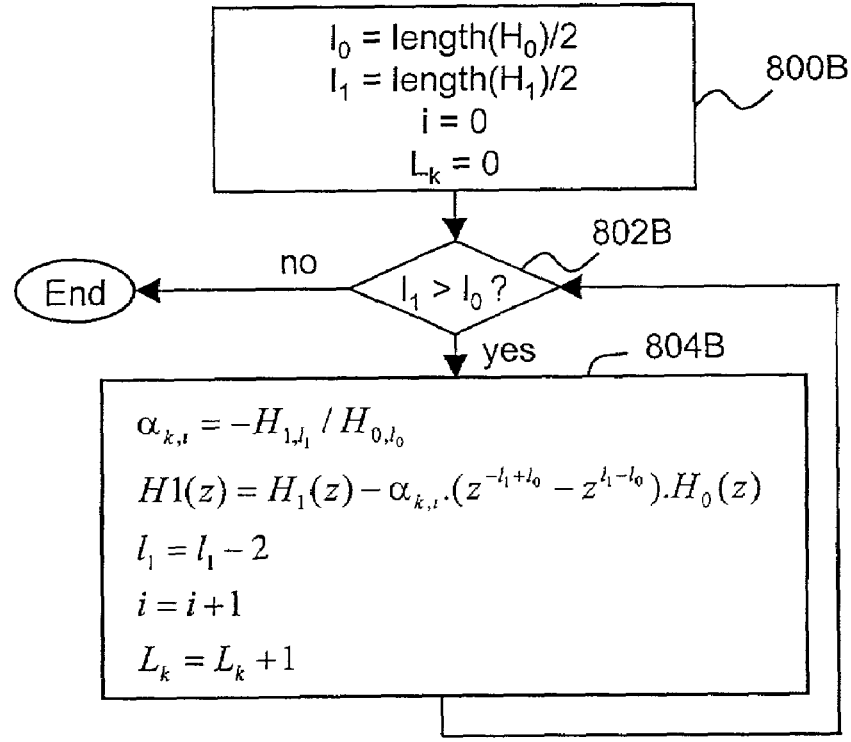

As shown by FIG. 8B, which illustrates the procedure UNLIFT_H1, an initialisation step 800B identical to step 800A of FIG. 8A is first of all performed.

Then a step 802B consists of testing whether $l_1 > l_0$.

If the result of test 802B is negative, the procedure UNLIFT_H1 is terminated.

If the result of test 802B is positive, a step 804B consists of calculating $\alpha_{k,i}$ and $H_1(z)$, as follows:

$$\alpha_{k,i} = -H_{1,l_1} / H_{0,l_0}$$

$$H_1(z) = H_1(z) - \alpha_{k,i} \cdot (z^{-l_1+l_0} - z^{l_1-l_0}) \cdot H_0(z)$$

At the end of step 804B, the value of $l_1$ is decremented by two units and the value of i and the value of $L_k$ are incremented by one unit.

Then this step 804B is reiterated as long as $l_1 > l_0$.

Figure 8C:
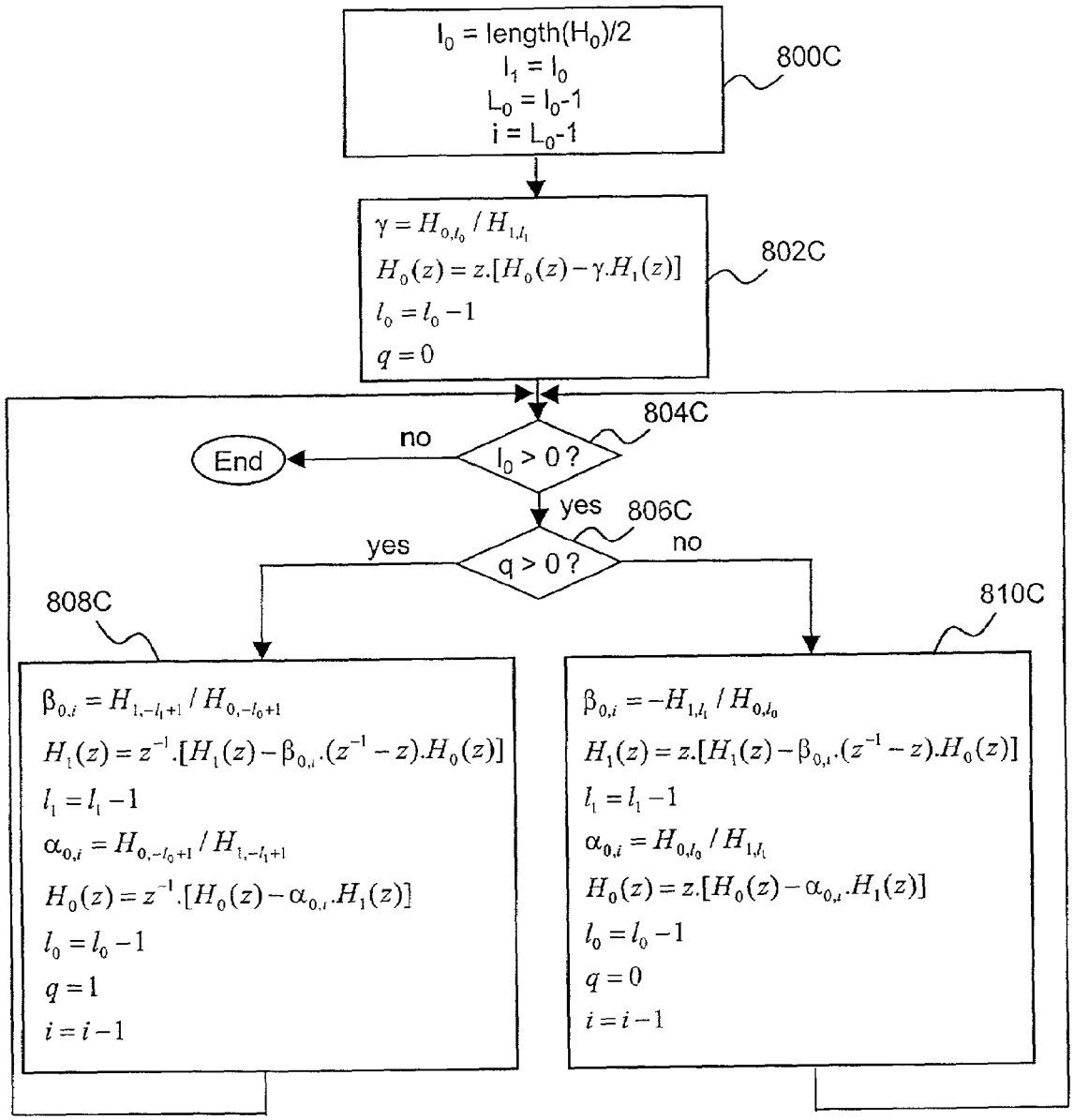

As shown in FIG. 8C, which illustrates the procedure UNLIFT_EQ, an initialisation step 800C consists of storing in the variable $l_0$ half of the length of $H_0$, and storing in the variable $l_1$ the value of $l_0$. During step 800C, the variable $L_0$ is also initialised to the value $l_0-1$ and a variable i to the value $L_0-1$.

The following step 802C consists of calculating $H_o(z)$ and the parameter $\gamma$, as follows:

$\gamma = H_{0,l_0}/H_{1,l_1}$ $H_0(z) = z.[H_0(z) - \gamma.H_1(z)]$

At the end of step 802C, the value of $l_0$ is decremented by one unit and a variable q is initialised to the value 0.

Then a step 804C consists of testing whether $l_0 > 0$.

If the result of test 804C is negative, the procedure UNLIFT_EQ is terminated.

If the result of test 804C is positive, a step 806C consists of testing whether $q > 0$.

If the result of test 806C is positive, the following step 808C consists of calculating $\beta_{0,i}$, $H_1(z)$, $\alpha_{0,i}$ and $H_0(z)$, as follows:

$\beta_{0,i} = H_{1,-l_1+1}/H_{0,-l_0+1}$ $H_1(z) = z^{-1}.[H_1(z) - \beta_{0,i}.(z^{-1} - z).H_0(z)]$ $\alpha_{0,i} = -H_{0,-l_0+1}/H_{1,-l_1+1}$ $H_0(z) = z^{-1}.[H_0(z) - \alpha_{0,i}.H_1(z)]$ During step 808C, after calculating $H_1(z)$, the value of $l_1$ is decremented by one unit and, after calculating $H_0(z)$, the value of $l_0$ and the value of i are decremented by one unit and the value 1 is stored in the variable q.

Then this step 808C is reiterated as long as $l_0 > 0$.

If the result of test 806C is negative, the following step 810C consists of calculating $\beta_{0,i}$, $H_1(z)$, $\alpha_{0,i}$ and $H_0(z)$, as follows:

$\beta_{0,i} = -H_{1,l_1}/H_{0,l_0}$ $H_1(z) = z.[H_1(z) - \beta_{0,i}.(z^{-1} - z).H_0(z)]$ $\alpha_{0,i} = H_{0,l_0}/H_{1,l_1}$ $H_0(z) = z.[H_0(z) - \alpha_{0,i}.H_1(z)]$ During step 810C, after calculation of $H_1(z)$, the value of $l_1$ is decremented by one unit and, after calculation of $H_0(z)$, the value of $l_0$ and the value of i are decremented by one unit and the value 0 is stored in the variable q.

Then this step 810C is reiterated as long as $l_0 > 0$.

Figure 9:
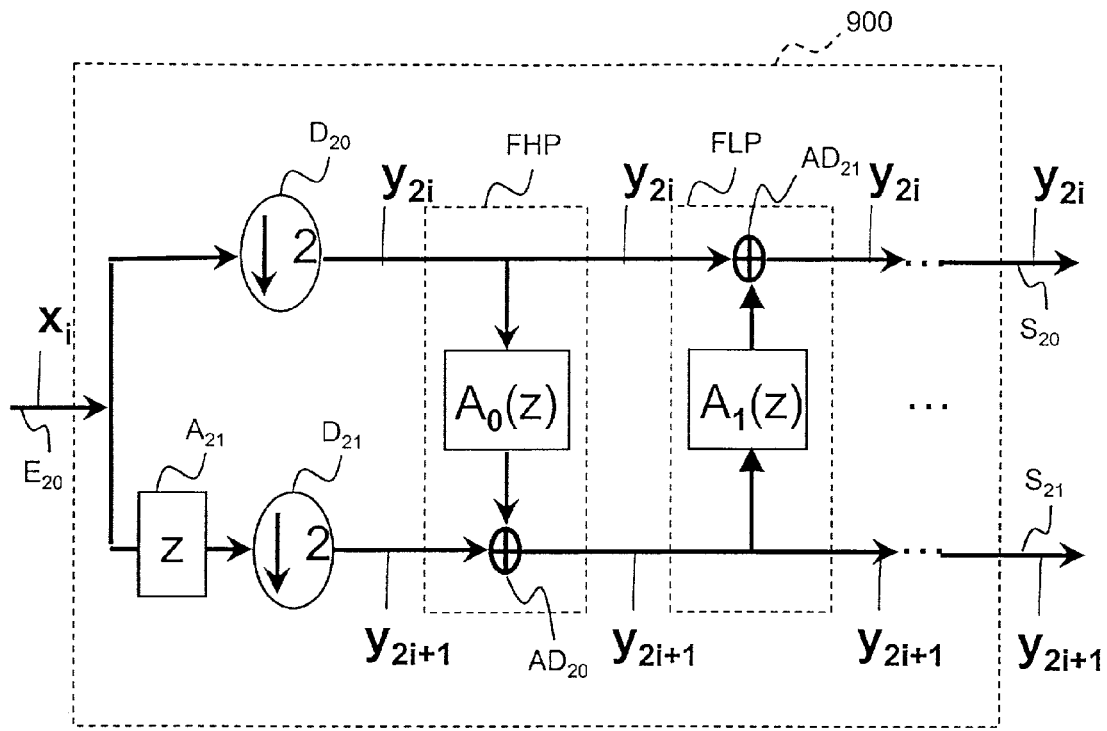
FIG. 9 depicts a first embodiment of an elementary transformation unit according to the present invention.
Figure 10:
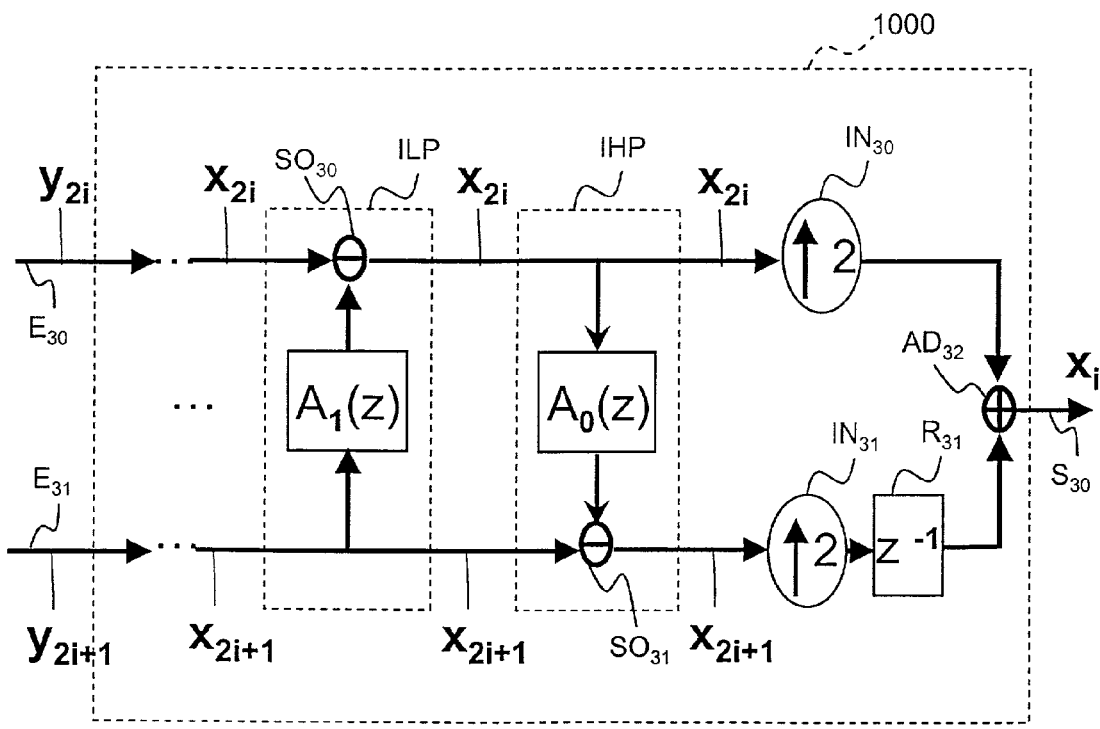
FIG. 10 depicts a second embodiment of an elementary transformation unit according to the present invention.

FIGS. 9 and 10 illustrate in schematic form an elementary transformation unit included in a filtering device in accordance with the present invention, in two particular embodiments. FIG. 9 illustrates more particularly a forward lifting transformation unit and FIG. 10 illustrates more particularly a reverse lifting transformation unit.

The filtering device 900 shown schematically in FIG. 9 is equivalent to that of the unit BE illustrated in FIG. 4.

It has an input $E_{20}$ to which the signal to be transformed is applied. The signal to be transformed includes a series of samples $\{x_i\}$, where i is a sample rank index.

The input $E_{20}$ is connected to a first decimator by two $D_{20}$, which delivers the even-indexed samples $\{x_{2i}\}$.

The input $E_{20}$ is also connected to an advance $AV_{21}$ followed by a second decimator $D_{21}$, which delivers the odd-indexed samples $\{x_{2i+1}\}$.

The first decimator $D_{20}$ is connected to a first filter $A_0$, which filters the even-indexed samples by applying to them a weighting coefficient $\beta_{0,j}$ and an approximation function as described in equation (18) and supplies them to an adder $AD_{20}$.

The assembly formed by the filter $A_0$ and the adder $AD_{20}$ is a high-pass lifting module, denoted FHP in the drawing.

The output of the second decimator $D_{21}$ is also connected to the adder $AD_{20}$.

Consequently the adder $AD_{20}$ delivers intermediate samples $y_{2i+1}$ calculated according to equation (18).

The output of the adder $AD_{20}$ is also connected to a second filter $A_1$ which filters the odd-indexed samples by applying to them a weighting coefficient $\alpha_{0,j}$ and an approximation function as described in equation (17) and supplies them to an adder $AD_{21}$.

The assembly formed by the filter $A_1$ and the adder $AD_{21}$ is a low-pass lifting module, denoted FLP in the drawing.

The output of the first decimator $D_{20}$ is also connected to the adder $AD_{21}$.

The output of the adder $AD_{21}$ is the first output $S_{20}$ of the transformation unit, which delivers a digital signal containing low-frequency samples $y_{2i}$.

The adder $AD_{20}$ is connected to a second output $S_{21}$ of the elementary unit, which delivers a digital signal containing high-frequency samples $y_{2i+1}$.

The filtering device 1000 shown schematically in FIG. 10 effects the transformation which is the reverse of that effected by the filtering device 900 shown schematically in FIG. 9.

This transformation unit has a first input $E_{30}$ to which a first signal to be transformed is applied and a second input $E_{31}$ to which a second signal to be transformed is applied.

The signals to be transformed contain here the samples obtained after analysis filtering of a digital signal by the analysis unit of FIG. 9. These samples have possibly been modified by another processing between analysis and synthesis.

More precisely, the first signal to be transformed contains the low-frequency samples $\{y_{2i}\}$ and the second signal to be transformed contains the high-frequency samples $\{y_{2i+1}\}$.

The synthesis unit has a structure similar to that of the analysis unit, and can be derived from it simply. In particular, the synthesis unit uses the same filters $A_0$ and $A_1$ as the analysis unit.

The input $E_{30}$ is connected to a subtracter $SO_{30}$.

The input $E_{31}$ is connected to the filter $A_1$, itself connected to the subtracter $SO_{30}$.

The assembly formed by the filter $A_1$ and the subtracter $SO_{30}$ is a low-pass lifting module, denoted ILP in the drawing.

The output of the subtracter $SO_{30}$ delivers a digital signal containing intermediate samples $y_{2i}$ calculated according to equation (32).

The output of the subtracter $SO_{30}$ is connected to the filter $A_0$, itself connected to a subtracter $SO_{31}$, to which the input $E_{31}$ is also connected.

The assembly formed by the filter $A_0$ and the subtracter $SO_{31}$ is a high-pass lifting module, denoted IHP in the drawing.

The output of the subtracter $SO_{31}$ delivers a digital signal containing reconstructed odd-indexed samples $x_{2i+1}$.

The output of the subtracter $SO_{30}$ delivers a digital signal containing reconstructed even-indexed samples $x_{2i}$.

The output of the subtracter $SO_{30}$ is connected to an interpolator by two $IN_{30}$ and the output of the subtracter $SO_{31}$ is connected to an interpolator by two $IN_{31}$ itself connected to a delay $R_{31}$. The interpolator $IN_{30}$ and the delay $R_{31}$ are connected to an adder $AD_{32}$, which delivers as an output $S_{30}$ the signal containing the reconstructed samples $x_i$.

An example, in no way limitative, of forward and reverse transformation by lifting for the implementation of wavelet filters according to the invention is now given.

The pair of filters used in this example are as follows:

$$H_0(z) = \frac{\alpha \cdot z^{-1} + 1 + z + \alpha \cdot z^2}{2 \cdot (\alpha + 1)} \quad (35)$$

$$H_1(z) = \frac{\alpha \cdot z^{-1} + 1 - z + \alpha \cdot z^2}{2 \cdot (\alpha - 1)} \quad (36)$$

The lifting parameters corresponding to this pair of filters are:

$$k=1, L_0=1 \text{ and } \alpha_{0,0}=\alpha. \quad (37)$$

An approximation function R identical for all the lifting steps, defined by $R(x)=E(x+\frac{1}{2})$ where E designates the integer part, is also chosen.

The length of the signal is chosen so as to be equal to 6: $i_0=0$ and $i_1=6$.

With regard to the forward lifting equations, all the values of the output signal Y are initialised to the values of the input signal X. The signal Y is then extended by one sample at each limit: $y_{-1}=y_0$ and $y_6=y_5$.

The following four lifting operations are performed. First of all, the values of the samples $(y_{-1}, y_1, y_3, y_5)$ are calculated from:

$$y_{2n+1}=y_{2n+1}-E(y_{2n+2}+\tfrac{1}{2}) \text{ for } n=-1, 0, 1, 2 \quad (38)$$

Next, the values of the samples $(y_0, y_2, y_4, y_6)$ are calculated from:

$$y_{2n}=y_{2n}+E(\alpha_{0,0}.y_{2n-1}+\tfrac{1}{2}) \text{ for } n=0, 1, 2, 3 \quad (39)$$

where $$\alpha_{0,0}=\alpha \quad (40)$$

Then the values of the samples $(y_1, y_3, y_5)$ are calculated from:

$$y_{2n+1}=y_{2n+1}+E[\beta_{0,0}.(y_{2n}-y_{2n+2})+\tfrac{1}{2})] \text{ for } n=0, 1, 2 \quad (41)$$

where $$\beta_{0,0}=-1/(1-2\alpha) \quad (42)$$

Finally, the values of the samples $(y_0, y_2, y_4)$ are calculated from:

$$y_{2n}=y_{2n}+E(\gamma.y_{2n+1}+\tfrac{1}{2}) \text{ for } n=0, 1, 2 \quad (43)$$

where $$\gamma=-1/(2\beta_{0,0}) \quad (44)$$

With regard to the reverse lifting equations, all the values of the output signal X are initialised to the values of the input signal Y. The signal X is then extended by two samples at each limit: $x_{-2}=x_0$, $x_{-1}=-x_1$ and $x_6=x_4$ and $x_7=-x_5$.

The following four reverse lifting operations are performed. First of all, the values of the samples $(x_{-2}, x_0, x_2, x_4, x_6)$ are calculated from:

$$x_{2n}=x_{2n}-E(\gamma.x_{2n+1}+\tfrac{1}{2}) \text{ for } n=-1, 0, 1, 2, 3 \quad (45)$$

Next, the values of the samples $(x_{-1}, x_1, x_3, x_5)$ are calculated from:

$$x_{2n+1}=x_{2n+1}-E[\beta_{0,0}.(x_{2n}-x_{2n+2})+\tfrac{1}{2})] \text{ for } n=-1, 0, 1, 2 \quad (46)$$

Then the values of the samples $(x_0, x_2, x_4, x_6)$ are calculated from:

$$x_{2n}=x_{2n}-E(\alpha_{0,0}.x_{2n-1}+\tfrac{1}{2}) \text{ for } n=0, 1, 2, 3 \quad (47)$$

Finally, the values of the samples $(x_1, x_3, x_5)$ are calculated from:

$$x_{2n+1}=x_{2n+1}+E(x_{2n+2}+\tfrac{1}{2}) \text{ for } n=0, 1, 2 \quad (48)$$

The field of application of the present invention is not limited to HSS/HSA wavelet filters with equal supports, but extends much more broadly, on the one hand, to orthogonal wavelet filters and, on the other hand, to any wavelet filters with equal supports.

With regard to the application of the invention to the implementation by lifting of orthogonal wavelet filters, the only difference compared with what was described previously lies in the value of the lifting parameters $\alpha_{0,i}$, $\beta_{0,i}$, $\gamma$ and in the relationship between these parameters, in order to guarantee that they implement HSS/HSA filters or orthogonal filters equally well. It should be noted that the method of calculating the lifting parameters, described above in relation to FIGS. 7 and 8, can be used for generating all the lifting parameters $\alpha_{0,i}$, $\beta_{0,i}$, $\gamma$ for the HSS/HSA filters and for orthogonal filters.

All the orthogonal filters have equal support and even length but are not symmetrical, except in one trivial case: the Haar filter, defined by $H_0(z)=(1+z)/2$ and $H_1(z)=-1+z$.

The orthogonal filters of length 4 are characterised by a parameter $\theta$ representing one degree of freedom:

$$H_0(z) = \frac{\cos\theta \cdot (\sin\theta + \cos\theta) \cdot z^{-1} + \sin\theta \cdot (\sin\theta + \cos\theta) +}{2} \\ \frac{\sin\theta \cdot (\sin\theta - \cos\theta) \cdot z + \cos\theta \cdot (\cos\theta - \sin\theta) \cdot z^2}{2} \quad (49)$$

$$H_1(z) = \cos\theta.(\cos\theta - \sin\theta).z^{-1} - \sin\theta.(\sin\theta - \cos\theta) + \sin\theta.(\sin\theta + \cos\theta).z - \cos\theta.(\sin\theta + \cos\theta).z^2 \quad (50)$$

In more general terms, the orthogonal filters satisfy the equation:

$$H_1(z) = 2z.H_0(-z^{-1}) \quad (51)$$

In the non-limitative example given here, as before, an approximation function R identical for all the lifting steps is chosen and defined by $R(x)=x+\tfrac{1}{2}$.

The length of the signal is chosen so as to be equal to 6: $i_0=0$ and $i_1=6$.

The implementation by lifting of such a filter is carried out using the same steps as in the previous example (except with regard to the extension procedure, described below) except that the parameters are here chosen as follows:

$$k=1, L_0=1, \alpha_{0,0}=\frac{\cos\theta}{\sin\theta+\cos\theta}, \beta_{0,0}=\cos(2\theta), \gamma=\frac{\sin\theta-\cos\theta}{2(\sin\theta+\cos\theta)} \quad (52)$$

The lifting factorisation procedure given above is similar for orthogonal filters. The only difference lies in the relationship between the coefficients $\alpha_{0,i}$, $\beta_{0,i}$, $\gamma$.

As has been seen for HSS/HSA filters, the parameters $\alpha_{0,i}$ are a function of the coefficients of the filters of the wavelet transformation to be effected. The same applies to orthogonal filters. The method of calculating the lifting parameters described above is unchanged.

As has been seen for the HSS/HSA filters, the parameters $\beta_{0,i}$ are a function of the parameters $\alpha_{0,i}$ and are such that they guarantee that the equivalent high-pass filter $H_1(z)$ of each high-pass lifting step is HSA. The situation is similar for orthogonal filters: the parameters $\beta_{0,i}$ are a function of the parameters $\alpha_{0,i}$ and are such that they guarantee that the equivalent high-pass filter $H_1(z)$ of each high-pass lifting step is such that $H_0(z)=-z.H_1(-z^{-1})/2$ and $H_1(z)$ define an orthogonal wavelet transformation. The method of calculating the lifting parameters described above can also be used for calculating the parameters $\beta_{0,i}$.

Finally, as has been seen for the HSS/HSA filters, the parameter $\gamma$ is a function of the parameters $\beta_{0,L_0-1}$ and is such that it guarantees that the equivalent low-pass filter $H_0(z)$ of this low-pass lifting step is HSS. The situation is similar for the orthogonal filters: the parameter $\gamma$ is a function of the parameters $\alpha_{0,i}$ and $\beta_{0,i}$ and is such that it guarantees that the equivalent low-pass filter $H_0(z)$ of this low-pass lifting step is such that $H_0(z)=-z.H_1(-z^{-1})/2$. The method of calculating the lifting parameters described above can also be used for calculating the parameter $\gamma$.

For transformation by forward lifting, all the values of the output signal Y are initialised to the values of the input signal X. The signal Y is then extended by one sample at each limit: in the example supplied here, use is made of an extension procedure known to a person skilled in the art as circular extension: $y_{-1}=y_5$ and $y_6=y_0$.

All the subsequent steps are identical to those of the previous example, using the values given in equation (52).

For transformation by reverse lifting, all the values of the output signal X are initialised to the values of the input signal Y. The signal X is then extended by two samples at each limit: $x_{-2}=x_4$, $x_{-1}=x_5$, $x_6=x_0$ and $x_7=x_1$.

All the subsequent steps are identical to those of the previous example, using the values given in equation (52).

With regard to the application of the invention to the implementation by lifting of any wavelet filters with equal support, the only differences compared with what was described above for the HSS/HSA filters and the orthogonal filters are as follows:

there is no dependency relationship between the parameters $\alpha_{0,i}$, $\beta_{0,i}$, $\gamma$; it is therefore not necessary to calculate these values in the RAM;

the first high-pass lifting step in the forward implementation by lifting can be any, that is to say:

$$y_{2n+1} = y_{2n+1} - R\left(\sum_i \delta_i \cdot y_{2n+2i}\right) \quad (53)$$

where $\delta_i$ is a weighting coefficient.

It should be noted that, for example, if use is made, in the forward transformation, instead of equation (16), of the following equation:

$$y_{2n+1} = y_{2n+1} - R\left(\frac{y_{2n} + y_{2n+2}}{2}\right) \quad (16a)$$

then, in the reverse transformation, the last lifting step 620 is exactly its reverse, that is to say, in the above case:

$$x_{2n+1} = x_{2n+1} + R\left(\frac{x_{2n} + x_{2n+2}}{2}\right) \quad (34)$$

All the lifting coefficients $\alpha_{0,i}$, $\beta_{0,i}$, $\gamma$ necessary for the implementation by lifting of a pair of any wavelet filters with equal support can be obtained by means of the method of calculating the lifting parameters described above in relation to FIGS. 7 and 8. The lifting coefficients $\delta_i$ are then the even-indexed coefficients of the filter $H_1(z)$ obtained from the formula $(L_k, \alpha_{k,i}, H_1, H_0)=\text{UNLIFT\_EQ}(H_0, H_1)$ of step 714 illustrated in FIG. 7.

The invention claimed is:

1. A filtering method for transforming an input digital signal into one or more output digital signals having even-indexed samples and odd-indexed samples, said method including at least one iteration comprising the steps of:
   modifying the even-indexed samples by a function of weighted odd-indexed samples; and
   modifying the odd-indexed samples by a function of weighted even-indexed samples,
   wherein the weighted samples are obtained by at least one weighting operation applied to a difference between two consecutive even-indexed samples.

2. A filtering method according to claim 1, wherein said step of modifying the odd-indexed samples is performed after said step of modifying the even-indexed samples.

3. A filtering method according to claim 1 or 2, wherein said iteration further comprises:
   weighting, by a first weighting coefficient, at least one odd-indexed sample adjacent to an even-indexed sample currently being modified, so as to obtain a weighted odd-indexed sample;
   modifying at least one even-indexed sample using the at least one weighted odd-indexed sample;
   weighting, by a second weighting coefficient, even-indexed samples adjacent to an odd-indexed sample currently being modified, so as to obtain weighted even-indexed samples; and
   modifying at least one odd-indexed sample using at least one weighted even-indexed sample.

4. A filtering method according to claim 3, wherein the second weighting coefficient is a function of the first weighting coefficient.

5. A filtering method according to claim 4, wherein the second weighting coefficient is a function of the first weighting coefficient as follows:

$$\beta_{0,j} = m_j \bigg/ \left(1 - 2\sum_{i=0}^{j} \alpha_{0,i}\right)$$

where $\alpha_{0,j}$ designates the first weighting coefficient, $\beta_{0,j}$ designates the second weighting coefficient, i and j are integers, $m_j$ is a value defined by a recurrence $m_0=(-1)^{L_0}$ and $m_j=-m_{j-1}$, and $L_0$ is a predetermined integer.

6. A filtering method according to claim 1, wherein at each iteration, an odd-indexed sample adjacent to an even-indexed sample, the even-indexed sample having a given rank and currently being modified, has a rank that is either immediately below said given rank or immediately above said given rank.

7. A filtering method according to claim 1, further comprising, at the end of said iteration, an additional step of filtering that includes weighting by a third weighting coefficient.

8. A filtering method according to claim 7, wherein the third weighting coefficient is a function of the weighting coefficient used in the preceding step, as follows:

$$\gamma=-1/(2\beta_{0,L_0-1})$$

where $\gamma$ designates the third weighting coefficient, $L_0$ is a predetermined parameter and $\beta_{0,L_0-1}$ designates the weighting coefficient used in the preceding step.

9. A filtering method according to claim 1, wherein the digital input signal represents an image.

10. A filtering method for transforming one or more input digital signals into an output digital signal, the input signals including even-indexed samples and odd-indexed samples, said method including at least one iteration comprising the steps of:
modifying odd-indexed samples by a function of weighted even-indexed samples; and
modifying even-indexed samples by a function of weighted odd-indexed samples,
wherein the weighted samples are obtained by at least one weighting operation applied to a difference between two consecutive even-indexed samples.

11. A filtering method according to claim 10, wherein said step of modifying even-indexed samples is performed after said step of modifying odd-indexed samples.

12. A filtering method according to claim 10 or 11, wherein said iteration further comprises steps of:
weighting, by a first weighting coefficient, even-indexed samples adjacent to an odd sample currently being modified, so as to obtain weighted even-indexed samples;
modifying at least one odd-indexed sample using at least one weighted even-indexed sample;
weighting, by a second coefficient, at least one odd-indexed sample adjacent to an even sample currently being modified, so as to obtain a weighted odd-indexed sample; and
modifying at least one even-indexed sample using at least one weighted odd-indexed sample.

13. A filtering method according to claim 12, wherein the first weighting coefficient is a function of the second weighting coefficient.

14. A filtering method according to claim 13, wherein the first weighting coefficient is a function of the second weighting coefficient as follows:

$$\beta_{0,j} = m_j \bigg/ \left(1 - 2\sum_{i=0}^{j} \alpha_{0,i}\right)$$

where $\alpha_{0,j}$ designates the second weighting coefficient, $\beta_{0,j}$ designates the first weighting coefficient, i and j are integers, $m_j$ is a value defined by a recurrence $m_0=(-1)^{L_0}$ and $m_j=-m_{j-1}$, and $L_0$ is a predetermined integer.

15. A filtering method according to claim 10, wherein, at each iteration, an odd-indexed sample adjacent to an even-indexed sample, the even-indexed sample having a given rank and currently being modified, has a rank that is either immediately below said given rank or immediately above said given rank.

16. A filtering method according to claim 10, further comprising, prior to said iteration, an additional step of filtering that includes weighting by a third weighting coefficient.

17. A filtering method according to claim 16, wherein the third weighting coefficient is a function of the weighting coefficient used in the following step, as follows:

$\gamma = -1/(2\beta_{0, L_0-1})$ where $\gamma$ designates the third weighting coefficient, $L_0$ is a predetermined parameter and $\beta_{0, L_0-1}$ designates the weighting coefficient used in the following step.

18. A filtering method according to claim 10, wherein the digital output signal represents an image.

19. A filtering method according to claim 1 or 10, wherein said modification steps comprise applying an approximation function.

20. A filtering method according to claim 19, wherein the approximation function is an identity function.

21. A filtering method according to claim 19, wherein the approximation function is a function of a real variable which supplies the closest integer to said real variable.

22. A filtering method according to claim 19, wherein the approximation function is a function of a real variable which supplies the first integer below said real variable.

23. A filtering method according to claim 19, wherein the approximation function is a function of a real variable which supplies the first integer above said real variable.

24. A filtering method according to claim 19, wherein the approximation function is a function of a variable decomposed into sub-variables whose sum is equal to the variable, which supplies a sum of approximate values of the sub-variables, each of the approximate values of the sub-variables being (i) either a function of a real variable which supplies the integer closest to the variable, (ii) a function of a real variable which supplies the first integer below the variable, or (iii) a function of a real variable which supplies the first integer above the variable.

25. A signal processing device, comprising means adapted to implement a filtering method according to claim 1 or 10.

26. A digital filtering device adapted to transform an input digital signal into one or more output digital signals containing even-indexed samples and odd-indexed samples, said filtering device comprising:
at least one weighting module; and
means for modifying even-indexed samples by a function of weighted odd-indexed samples,
wherein weighted samples are supplied by said at least one weighting module, said modification means functioning iteratively, so as to modify even-indexed samples at least once and then odd-indexed samples at least once, and said at least one weighting module receives as an input the difference between two consecutive even-indexed samples.

27. A digital filtering device according to claim 26, wherein said means for modifying odd-indexed samples is disposed downstream of said means for modifying even-indexed samples.

28. A digital filtering device according to claim 26 or 27, further comprising:
means for weighting, by a first weighting coefficient, at least one odd-indexed sample adjacent to an even sample currently being modified, so as to obtain a weighted odd-indexed sample;
means for modifying at least one even-indexed sample using at least one weighted odd-indexed sample;
means for weighting, by a second weighting coefficient, even-indexed samples adjacent to an odd sample currently being modified, so as to obtain weighted even-indexed samples; and
means for modifying at least one odd-indexed sample using the at least one weighted even-indexed sample.

29. A digital filtering device according to claim 28, wherein the second weighting coefficient is a function of the first weighting coefficient.

30. A digital filtering device according to claim 29, wherein the second weighting coefficient is a function of the first weighting coefficient as follows:

$$\beta_{0,j} = m_j \bigg/ \left(1 - 2\sum_{i=0}^{j} \alpha_{0,i}\right)$$

where $\alpha_{0,j}$ designates the first weighting coefficient, $\beta_{0,j}$ designates the second weighting coefficient, i an j are integers, $m_j$ is a value defined by a recurrence of $m_0=(-1)^{L_0}$ and $m_j=-m_{j-1}$, and $L_0$ is a predetermined integer.

31. A digital filtering device according to claim 26, wherein, at each iteration, an odd-indexed sample adjacent to an even-indexed sample, the even-indexed sample having a given rank and currently being modified, has a rank that is either immediately below said given rank or immediately above said given rank.

32. A digital filtering device according to claim 26, further comprising additional filtering means including means of weighting by a third weighting coefficient.

33. A digital filtering device according to claim 32, wherein the third weighting coefficient is a function of the weighting coefficient used upstream of said additional filtering means, as follows:

$$\gamma = -1/(2\beta_{0, L_0-1})$$

where $\gamma$ designates the third weighting coefficient, $L_0$ is a predetermined parameter and $\beta_{0, L_0-1}$ designates the weighting coefficient used upstream of said additional filtering means.

34. A digital filtering device according to claim 26, wherein the input digital signal represents an image.

35. A digital filtering device adapted to transform one or more input digital signals into an output digital signal, the input signals containing even-indexed samples and odd-indexed samples, said filtering device comprising:
at least one weighting means;
means for modifying odd-indexed samples by a function of weighted even-indexed samples; and
means for modifying even-indexed samples by a function of weighted odd-indexed samples,
wherein said weighted samples are supplied by said at least one weighting means, said modification means functions iteratively, so as to modify odd-indexed samples at least once and then even-indexed samples at least once, and
wherein said at least one weighting means receives as an input the difference between two consecutive even-indexed samples.

36. A digital filtering device according to claim 35, wherein said means for modifying even-indexed samples is disposed downstream of said means for modifying odd-indexed samples.

37. A digital filtering device according to claims 35 or 36, further comprising:
means for weighting, by a first weighting coefficient, even-indexed samples adjacent to an odd sample currently being modified, so as to obtain weighted even-indexed samples;
means for modifying at least one odd-indexed sample using at least one weighted even-indexed sample;
means for weighting, by a second coefficient, at least one odd-indexed sample adjacent to an even sample currently being modified, so as to obtain a weighted odd-indexed sample; and
means for modifying at least one even-indexed sample using at least one weighted odd-indexed sample.

38. A digital filtering device according to claim 37, wherein the first weighting coefficient is a function of the second weighting coefficient.

39. A digital filtering device according to claim 38 wherein the first weighting coefficient is a function of the second weighting coefficient as follows:

$$\beta_{0,j} = m_j \bigg/ \left(1 - 2\sum_{i=0}^{j} \alpha_{0,i}\right)$$

where $\alpha_{0,j}$ designates the second weighting coefficient, $\beta_{0,j}$ designates the first weighting coefficient, i and j are integers, $m_j$ is a value defined by a recurrence $m_0=(-1)^{L_0}$ and $m_j=-m_{j-1}$, and $L_0$ is a predetermined integer.

40. A digital filtering device according to claim 35, wherein, at each iteration, an odd-indexed sample adjacent to an even-indexed sample, the even-indexed sample having a given rank and currently being modified, has a rank that is either immediately below said given rank or immediately above said given rank.

41. A digital filtering device according to claim 35, further comprising additional filtering means including means for weighting by a third weighting coefficient.

42. A digital filtering device according to claim 41, wherein the third weighting coefficient is a function of the weighting coefficient used downstream of said additional filtering means, as follows:

$$\gamma = -1/(2\beta_{0, L_0-1})$$

where $\gamma$ designates the third weighting coefficient, $L_0$ is a predetermined parameter and $\beta_{0, L_0-1}$ designates the weighting coefficient used downstream of said additional filtering means.

43. A digital filtering device according to claim 35, wherein the digital output signal represents an image.

44. A digital filtering device according to claim 26 or 35, wherein said modification means has means for applying an approximation function.

45. A digital filtering device according to claim 44, wherein the approximation function is an identity function.

46. A digital filtering device according to claim 44, wherein the approximation function is a function of a real variable which supplies the integer closest to said real variable.

47. A digital filtering device according to claim 44, wherein the approximation function is a function of a real variable which supplies the first integer below said real variable.

48. A digital filtering device according to claim 44, wherein the approximation function is a function of a real variable which supplies the first integer above said real variable.

49. A digital filtering device according to claim 44, wherein the approximation function is a function of a variable decomposed into sub-variables whose sum is equal to the variable, which supplies a sum of approximate values of the sub-variables, each of the approximate values of the sub-variables being either (i) a function of a real variable which supplies the integer closest to the variable, (ii) a function of a real variable which supplies a first integer below the variable, or (iii) a function of a real variable which supplies the first integer above the variable.

50. A signal processing device comprising a digital filtering device according to claim 26 or 35.

51. A signal processing device comprising at least two digital filtering devices according to claim 26 or 35, the output signal of one of the digital filtering devices being the input signal of the other digital filtering device.

52. A digital apparatus comprising a signal processing device according to claim 25.

53. A digital photographic apparatus comprising a signal processing device according to claim 25.

54. An encoding method comprising steps adapted to implement a filtering method according to claim 1 or 10.

55. An encoding device comprising at least one filtering device according to claim 26 or 35.

56. A digital compression method comprising steps adapted to implement a filtering method according to claim 1 or 10.

57. A digital signal compression device comprising at least one filtering device according to claim 26 or 35.

58. An information storage means which can be read by a computer or by a microprocessor, and which stores a program, comprising means adapted to implement a filtering method according to claim 1 or 10.

59. A computer program product comprising code for implementing a filtering method according to claim 1 or 35.

60. A digital apparatus comprising a signal processing device according to claim 50.

61. A digital photographic apparatus comprising a signal processing device according to claim 50.

62. A digital apparatus comprising a signal processing device according to claim 51.

63. A digital photographic apparatus comprising a signal processing device according to claim 51.

* * * * *

UNITED STATES PATENT AND TRADEMARK OFFICE
CERTIFICATE OF CORRECTION

PATENT NO. : 7,058,676 B2
APPLICATION NO. : 09/972994
DATED : June 6, 2006
INVENTOR(S) : Eric Majani It is certified that error appears in the above-identified patent and that said Letters Patent is hereby corrected as shown below:

COLUMN 1:
Line 42, "odd-indexed" (second occurrence) should be deleted.

COLUMN 4:
Line 62, "than 2." should read -- than two. --; and
Line 67, "contains" should read -- contains: --.

COLUMN 5:
Line 57, "m0=(-" should read -- $m_0$=(- --.

COLUMN 6:
Line 16, "contains" should read -- contains: --; and
Line 58, "integer" should read -- integers --.

COLUMN 7:
Lines 40 and 59, "having" should read -- having: --.

COLUMN 13:
Lines 4 and 5,

"$PSE(i,i_0,i_1)) = i_0 + \min[\mod(i - i_0, 2(i_1 - i_0)), 2(i_1 - i_0) - \mod(i - i_0, 2(i_1 - i_0))]$"
should read --$PSE(i,i_0,i_1) = i_0 + \min[\mod(i - i_0, 2(i_1 - i_0)), 2(i_1 - i_0) - \mod(i - i_0, 2(i_1 - i_0))]$--.

COLUMN 16:
Lines 10 and 11,
"$x_i = x_{i_0 + \mod(2(i_1 - i_0 - 1) - (i - i_0), 2(i_1 - i_0))}$"

should read
-- $x_i = x_{i_0 + \mod(2(i_1 - i_0 - 1) - (i - i_0), 2(i_1 - i_0))}$ --.

Lines 14 and 15,
" $x_i = x_{i_0 + \mod(2(i_1 - i_0) - (i - i_0), 2(i_1 - i_0))}$ "

should read
-- $x_i = x_{i_0 + \mod(2(i_1 - i_0) - (i - i_0), 2(i_1 - i_0))}$ --.

UNITED STATES PATENT AND TRADEMARK OFFICE
CERTIFICATE OF CORRECTION

PATENT NO. : 7,058,676 B2
APPLICATION NO. : 09/972994
DATED : June 6, 2006
INVENTOR(S) : Eric Majani It is certified that error appears in the above-identified patent and that said Letters Patent is hereby corrected as shown below:

COLUMN 19:
Line 15,

"$\beta_{o,i} = H_{1,-l_1+1} / H_{o,-l_0+1}$"

should read

--$\beta_{o,i} = H_{1,-l_1+1} / H_{o,-l_0+1}$--.

COLUMN 21:
Line 24
" $(y_{-1,y1}, y_3, y_5)$ "
should read
-- $(y_{-1}, y_1, y_3, y_5)$ --.

COLUMN 21:
Line 60,
" $(x_{-1, x1}, x_3, x_5)$ "
should read
-- $(x_{-1}, x_1, x_3, x_5)$ --.

COLUMN 24:
Line 46, "$\alpha_{o,j}$" should read -- $\alpha_{o,i}$ --.

COLUMN 25:
Line 44, "$\alpha_{o,j}$" should read -- $\alpha_{o,i}$ --.

COLUMN 27:
Line 7, "$\alpha_{o,j}$" should read -- $\alpha_{o,i}$ --; and
Line 8, "an" should read -- and --.

UNITED STATES PATENT AND TRADEMARK OFFICE
CERTIFICATE OF CORRECTION

PATENT NO.        : 7,058,676 B2
APPLICATION NO.   : 09/972994
DATED             : June 6, 2006
INVENTOR(S)       : Eric Majani It is certified that error appears in the above-identified patent and that said Letters Patent is hereby corrected as shown below:

COLUMN 28:
Line 13, "$\alpha_{o,j}$" should read -- $\alpha_{o,i}$ --.

Signed and Sealed this

Thirteenth Day of February, 2007

JON W. DUDAS
*Director of the United States Patent and Trademark Office*